(12) United States Patent
Kobayashi et al.

(10) Patent No.: US 10,834,354 B2
(45) Date of Patent: Nov. 10, 2020

(54) IMAGING DEVICE, IMAGING SYSTEM, MOVABLE OBJECT, AND SIGNAL PROCESSING DEVICE

(71) Applicant: CANON KABUSHIKI KAISHA, Tokyo (JP)

(72) Inventors: Daisuke Kobayashi, Kawaguchi (JP); Yoshikazu Yamazaki, Sagamihara (JP); Kazuo Yamazaki, Yokohama (JP); Wataru Endo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/443,119

(22) Filed: Jun. 17, 2019

(65) Prior Publication Data

US 2019/0394416 A1    Dec. 26, 2019

(30) Foreign Application Priority Data

Jun. 25, 2018 (JP) ................................ 2018-119645
Feb. 5, 2019 (JP) ................................ 2019-018616

(51) Int. Cl.
*H04N 5/378* (2011.01)
*H04N 5/374* (2011.01)
*H04N 5/3745* (2011.01)

(52) U.S. Cl.
CPC ......... *H04N 5/378* (2013.01); *H04N 5/37455* (2013.01)

(58) Field of Classification Search
CPC .... H04N 5/378; H04N 5/37455; H04N 5/359; H04N 5/3765; H04N 5/3698; H04N 5/357
See application file for complete search history.

(56) References Cited

U.S. PATENT DOCUMENTS

| | | |
|---|---|---|
| 7,423,790 B2 | 9/2008 | Kochi |
| 7,816,755 B2 | 10/2010 | Yamazaki |
| 7,889,254 B2 | 2/2011 | Kochi |
| 8,049,799 B2 | 11/2011 | Sonoda |
| 8,325,260 B2 | 12/2012 | Yamazaki |
| 8,760,337 B2 | 6/2014 | Yamazaki |
| 8,810,706 B2 | 8/2014 | Yamazaki |

(Continued)

FOREIGN PATENT DOCUMENTS

| | | |
|---|---|---|
| JP | 2012-85063 | 4/2012 |
| JP | 2017-17381 | 1/2017 |

*Primary Examiner* — Shahbaz Nazrul
(74) *Attorney, Agent, or Firm* — Venable LLP

(57) ABSTRACT

An imaging device includes: a plurality of pixels arranged to form rows and columns and each configured to output a signal in accordance with an incident light, a plurality of column signal processing units provided in association with the columns and each having an A/D conversion unit that performs A/D conversion on a signal output from the pixels arranged on a corresponding column, a plurality of memory units provided in association with the columns and each having a memory that holds digital data output from the column signal processing unit of a corresponding column, a transfer unit that sequentially outputs the digital data held in each of the plurality of memory units to a common output line, and a bit value inversion unit that inverts a value of a bit of one of first and second digital data sequentially output to the common output line.

36 Claims, 20 Drawing Sheets

(56) References Cited

U.S. PATENT DOCUMENTS

| | | | |
|---|---|---|---|
| 8,836,313 B2 | 9/2014 | Takagi | |
| 9,060,139 B2 | 6/2015 | Yamazaki | |
| 9,142,575 B2 | 9/2015 | Kobayashi | |
| 9,288,415 B2 | 3/2016 | Yamazaki | |
| 9,407,847 B2 | 8/2016 | Maehashi | |
| 9,438,841 B2 | 9/2016 | Yamazaki | |
| 9,509,931 B2 | 11/2016 | Kobayashi | |
| 9,667,901 B2 | 5/2017 | Sakai | |
| 9,681,076 B2 | 6/2017 | Oguro | |
| 9,749,570 B2 | 8/2017 | Yamashita | |
| 9,762,840 B2 | 9/2017 | Yamazaki | |
| 9,762,841 B2 | 9/2017 | Yamazaki | |
| 9,900,539 B2 | 2/2018 | Yamasaki | |
| 10,051,223 B2 | 8/2018 | Yamashita | |
| 10,057,529 B2 | 8/2018 | Saito | |
| 10,194,103 B2 | 1/2019 | Saito | |
| 10,249,678 B2 | 4/2019 | Ryoki | |
| 2006/0044170 A1* | 3/2006 | Boemler | H04N 5/378 341/155 |
| 2012/0013778 A1 | 1/2012 | Sonoda | |
| 2012/0211643 A1* | 8/2012 | Ikeda | H04N 5/378 250/208.1 |
| 2014/0145868 A1* | 5/2014 | Sugimoto | H03M 1/38 341/161 |
| 2018/0102384 A1* | 4/2018 | Shimotsusa | H01L 27/1464 |
| 2018/0102386 A1 | 4/2018 | Kobayashi | |
| 2018/0254298 A1 | 9/2018 | Shiomichi | |
| 2018/0277578 A1 | 9/2018 | Takada | |
| 2018/0309950 A1 | 10/2018 | Yamashita | |
| 2018/0316884 A1* | 11/2018 | Kuroda | H04N 5/23212 |

\* cited by examiner

DIGITAL MEMORY CELL 402

POSITION OF DIGITAL MEMORY UNIT

COMMON OUTPUT LINE 401

SWITCH 603

SWITCH 604

DIGITAL SIGNAL PROCESSING OUTPUT LINE 605

TIME

FIG. 14
RELATED ART
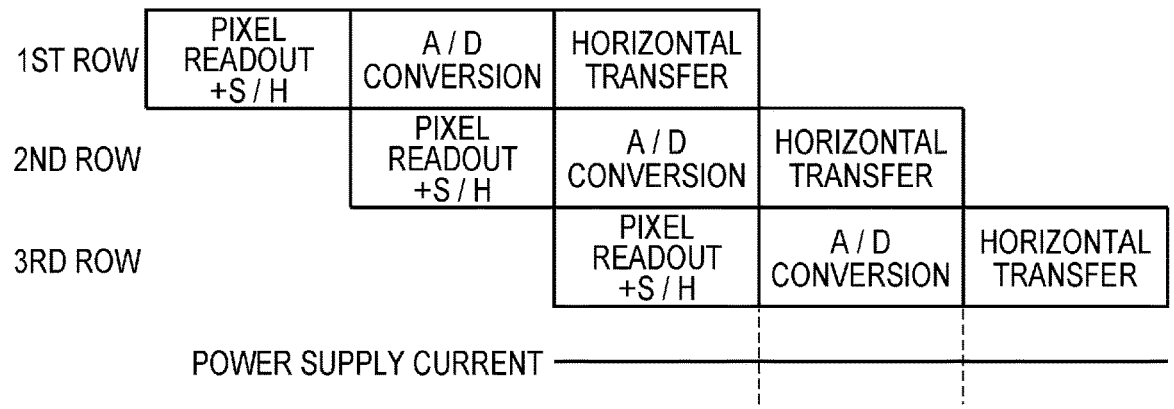
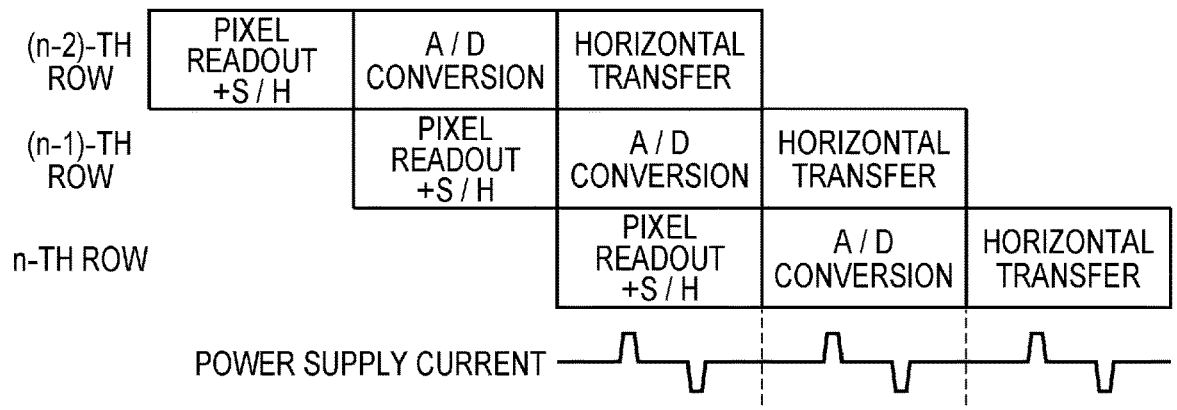
FIG. 15
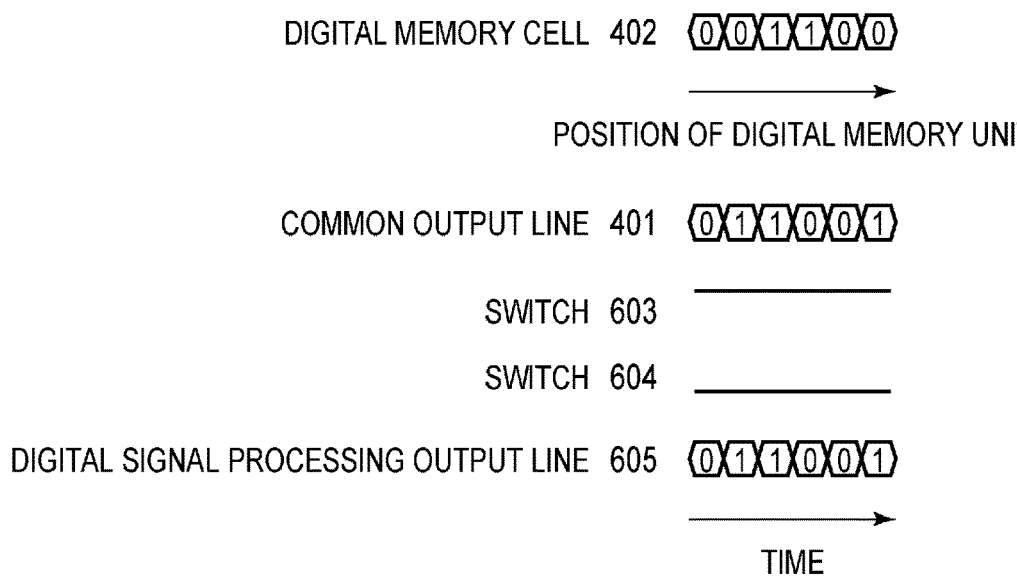

FIG. 16

DIGITAL MEMORY CELL 402 (0)(0)(1)(1)(0)(0)

COMMON OUTPUT LINE 401 (0)(1)(1)(0)(0)(1)

SWITCH 603

SWITCH 604

DIGITAL SIGNAL PROCESSING OUTPUT LINE 605 (0)(0)(1)(1)(0)(0)

DIGITAL MEMORY CELL 402 (0)(0)(0)(0)(0)(0)(0)(0)(0)(0)(0)(0)(0)(0)(0)(0)(0)(0)

COMMON OUTPUT LINE 401 (0)(1)(0)(1)(0)(1)(0)(1)(0)(1)(0)(1)(0)(1)(0)(1)(0)(1)

DIGITAL SIGNAL PROCESSING 605
OUTPUT LINE (0)(0)(0)(0)(0)(0)(0)(0)(0)(0)(0)(0)(0)(0)(0)(0)(0)(0)

POWER SUPPLY CURRENT

DIGITAL MEMORY CELL 402 (0)(0)(0)(0)(0)(0)(1)(1)(1)(1)(1)(1)(0)(0)(0)(0)(0)(0)

COMMON OUTPUT LINE 401 (0)(1)(0)(1)(0)(1)(1)(0)(1)(0)(1)(0)(0)(1)(0)(1)(0)(1)

DIGITAL SIGNAL PROCESSING 605
OUTPUT LINE (0)(0)(0)(0)(0)(0)(1)(1)(1)(1)(1)(1)(0)(0)(0)(0)(0)(0)

POWER SUPPLY CURRENT

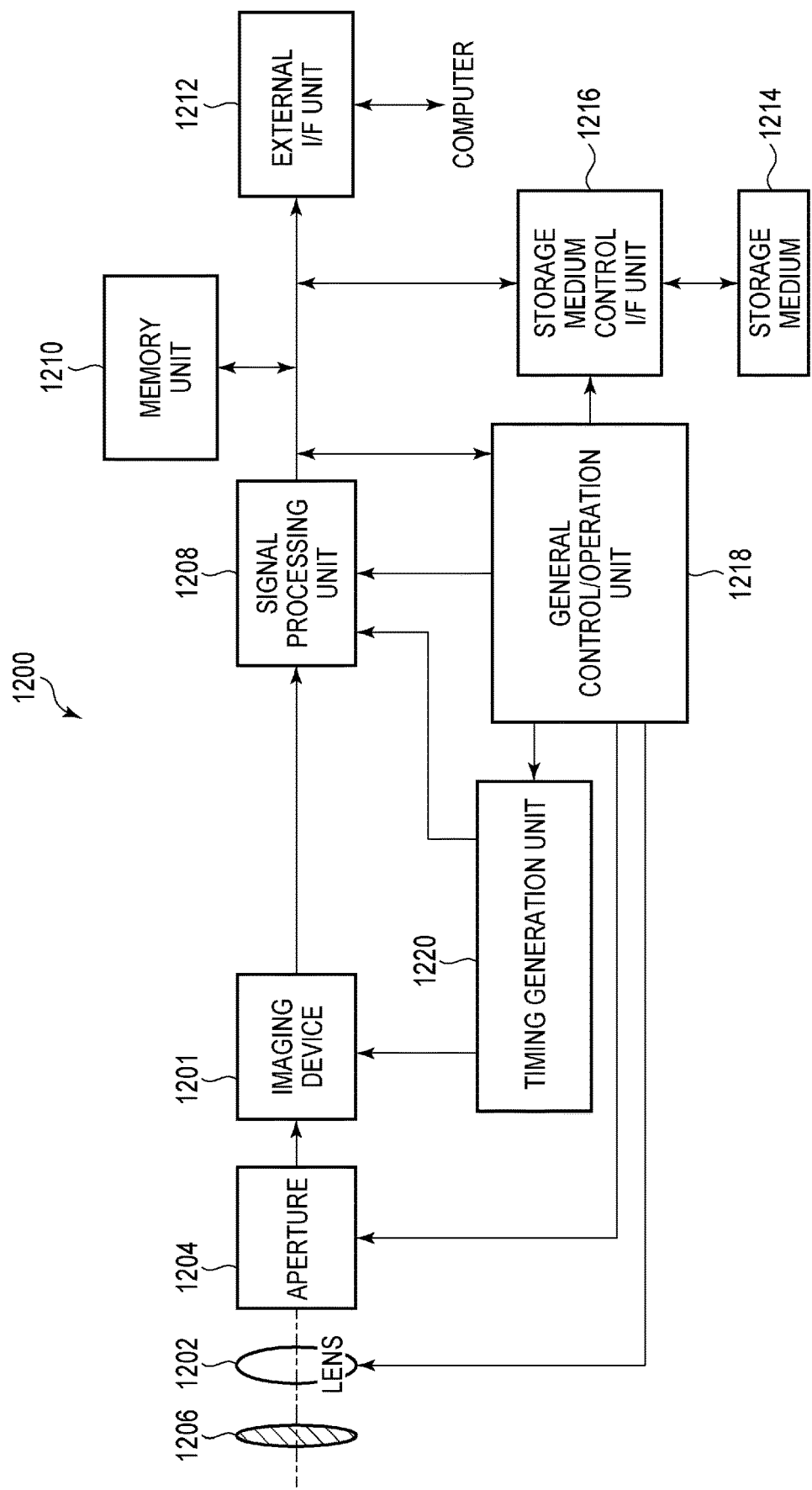

IMAGING DEVICE, IMAGING SYSTEM, MOVABLE OBJECT, AND SIGNAL PROCESSING DEVICE

BACKGROUND OF THE INVENTION

Field of the Invention

The present invention relates to an imaging device, an imaging system, a movable object, and a signal processing device.

Description of the Related Art

One of the area-type imaging devices for acquiring two-dimensional images is a CMOS-type image sensor (hereafter, referred to as a CMOS sensor). In recent years, a CMOS sensor that performs parallel processing on analog signals read out on a row basis from the pixel array by using analog-to-digital (A/D) converters provided in association with respective columns of a pixel array and converts the analog signals into an N-bit digital signal has been developed. Digital signals output from the A/D converters on respective columns are sequentially transferred to an output circuit by using a horizontal transfer circuit and output to the outside of the CMOS sensor. In such a CMOS sensor in which A/D converters are embedded on a column basis, it is possible to improve a framerate by performing a pipeline process on A/D conversion operations and horizontal transfer operations.

Japanese Patent Application Laid-Open No. 2012-085063 discloses a technology in which an A/D conversion error generated due to a change in a consumption current involved by a horizontal transfer operation is reduced in a CMOS sensor that performs a pipeline process on A/D conversion operations and horizontal transfer operations. Further, Japanese Patent Application Laid-Open No. 2017-017381 discloses a technology that ensures a transmission quality in serial transmission of digital data obtained by capturing an object.

The technology disclosed in Japanese Patent Application Laid-Open No. 2012-085063 is to reduce an A/D conversion error generated due to a change in a consumption current by adjusting the length of a horizontal transfer period. In the technology disclosed in Japanese Patent Application Laid-Open No. 2012-085063, however, since a change in a consumption current involved by a horizontal transfer operation is caused also by a change in transferred data, it is not possible to reduce an A/D conversion error involved by a change in transferred data that depends on an object. Further, in the technology disclosed in Japanese Patent Application Laid-Open No. 2017-017381, digital data is converted into random data in the course of data transmission, and a change of digital data that depends on an object may occur at the time of transfer of digital data output from an A/D converter. Thus, when driving a transmission path, it is not possible to suppress a change in a consumption current that may occur due to a change of digital data, and it is not possible to reduce an A/D conversion error involved by a change of transferred data that depends on an object.

SUMMARY OF THE INVENTION

The present invention intends to provide an imaging device that may reduce deterioration of image quality due to a change in a consumption current involved by a horizontal transfer operation of digital data.

According to one aspect of the present invention, provided is an imaging device including a plurality of pixels arranged to form a plurality of rows and a plurality of columns and each configured to output a signal in accordance with an incident light, a plurality of column signal processing units provided in association with the plurality of columns and each having an A/D conversion unit that performs A/D conversion on a signal output from the pixels arranged on a corresponding column, a plurality of memory units provided in association with the plurality of columns and each having a memory that holds digital data output from the column signal processing unit of a corresponding column, a transfer unit that sequentially outputs the digital data held in each of the plurality of memory units to a common output line, and a bit value inversion unit that inverts a value of a bit of one of first digital data and second digital data that are sequentially output to the common output line.

Further, according to another aspect of the present invention, provided is an imaging device including a plurality of pixels arranged to form a plurality of rows and a plurality of columns and each configured to output a signal in accordance with an incident light, a plurality of column signal processing units provided in association with the plurality of columns and each having an A/D conversion unit that performs A/D conversion on a signal output from the pixels arranged on a corresponding column, a plurality of memory units provided in association with the plurality of columns and each having a memory that holds digital data output from the column signal processing unit of a corresponding column, a transfer unit that sequentially outputs the digital data held in each of the plurality of memory units to a common output line, and a scrambling unit that performs a scrambling process on at least one of first digital data and second digital data that are sequentially output to the common output line.

Further, according to yet another aspect of the present invention, provided is an imaging device including a plurality of pixels arranged to form a plurality of rows and a plurality of columns and each configured to output a signal in accordance with an incident light, a plurality of column signal processing units provided in association with the plurality of columns and each having an A/D conversion unit that performs A/D conversion on a signal output from the pixels arranged on a corresponding column, a plurality of memory units provided in association with the plurality of columns and each having a memory that holds digital data output from the column signal processing unit of a corresponding column, a plurality of output lines, a transfer unit that outputs the digital data held by the plurality of memory units to the plurality of output lines, and a bit value inversion unit comprising a unit that inverts a value of a bit of at least one of first digital data output from a first memory unit of the plurality of memory units and second digital data output from a second memory unit of the plurality of memory units.

Further, according to yet another aspect of the present invention, provided is a signal processing device including a plurality of signal processing units each having an A/D conversion unit that performs A/D conversion on a signal based on an incident light, a plurality of memory units provided in association with the plurality of signal processing units and each having a memory that holds digital data output from corresponding one of the signal processing units, a transfer unit that sequentially outputs the digital data held in each of the plurality of memory units to a common output line, and a bit inversion unit that inverts a value of a bit of at least one of first digital data and second digital data that are sequentially output to the common output line.

Further, according to yet another aspect of the present invention, provided is a signal processing device including a plurality of signal processing units each having an A/D conversion unit that performs A/D conversion on a signal based on an incident light, a plurality of memory units provided in association with the plurality of signal processing units and each having a memory that holds digital data output from corresponding one of the signal processing units, a transfer unit that sequentially outputs the digital data held in each of the plurality of memory units to a common output line, and a scrambling unit that performs a scrambling process on at least one of the first digital data and the second digital data that are sequentially output to the common output line.

Further, according to yet another aspect of the present invention, provided is a signal processing device including a plurality of signal processing units each having an A/D conversion unit that performs A/D conversion on a signal based on an incident light, a plurality of memory units provided in association with the plurality of signal processing units and each having a memory that holds digital data output from each of the corresponding signal processing units, a plurality of output lines, a transfer unit that outputs the digital data held in the plurality of memory units to the plurality of output lines, and a bit value inversion unit comprising a unit that inverts a value of a bit of at least one of first digital data output from a first memory unit of the plurality of memory units and second digital data output from a second memory unit of the plurality of memory units.

Further features of the present invention will become apparent from the following description of exemplary embodiments with reference to the attached drawings.

BRIEF DESCRIPTION OF THE DRAWINGS

FIG. 14 is a diagram illustrating a relationship between a drive timing and a power supply current in the imaging device according to the reference example.

FIG. 15 and FIG. 16 are diagrams schematically illustrating data values on signal paths from the digital memory group to the digital signal processing output line of the imaging device according to the first embodiment of the present invention.

FIG. 17 and FIG. 18 are diagrams schematically illustrating data values on signal paths from the digital memory group to the digital signal processing output line when the object of FIG. 9 is captured by the imaging device according to the first embodiment of the present invention.

FIG. 34 is a block diagram illustrating a general configuration of an imaging system according to a ninth embodiment of the present invention.

DESCRIPTION OF THE EMBODIMENTS

Preferred embodiments of the present invention will now be described in detail in accordance with the accompanying drawings.

First Embodiment

An imaging device according to a first embodiment of the present invention will be described with reference to FIG. 1 to FIG. 20.

Figure 1:
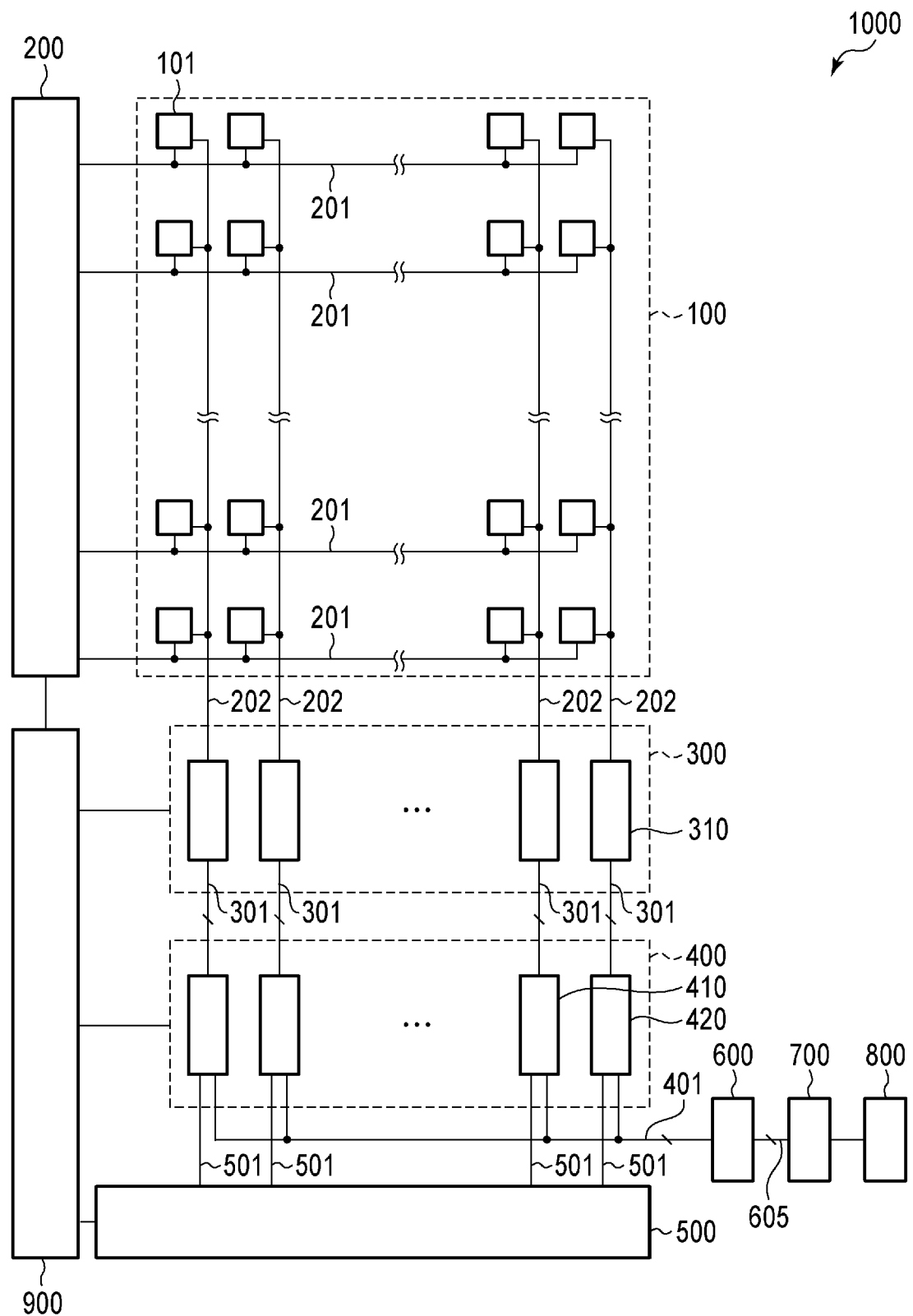
FIG. 1 is a block diagram illustrating a general configuration of an imaging device according to a first embodiment of the present invention.
Figure 2:
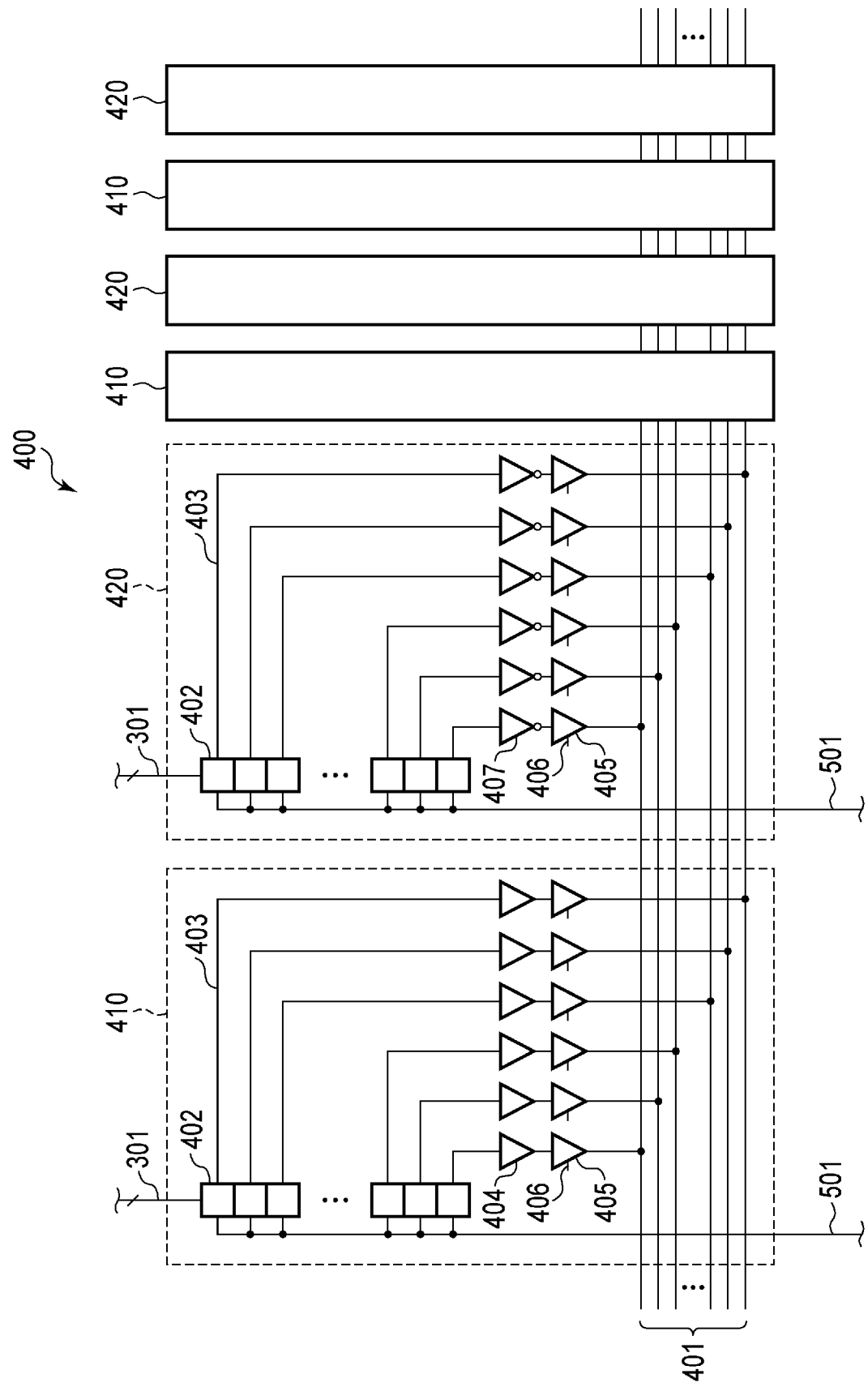
FIG. 2 is a schematic diagram illustrating a configuration example of a digital memory group in the imaging device according to the first embodiment of the present invention.
Figure 3:
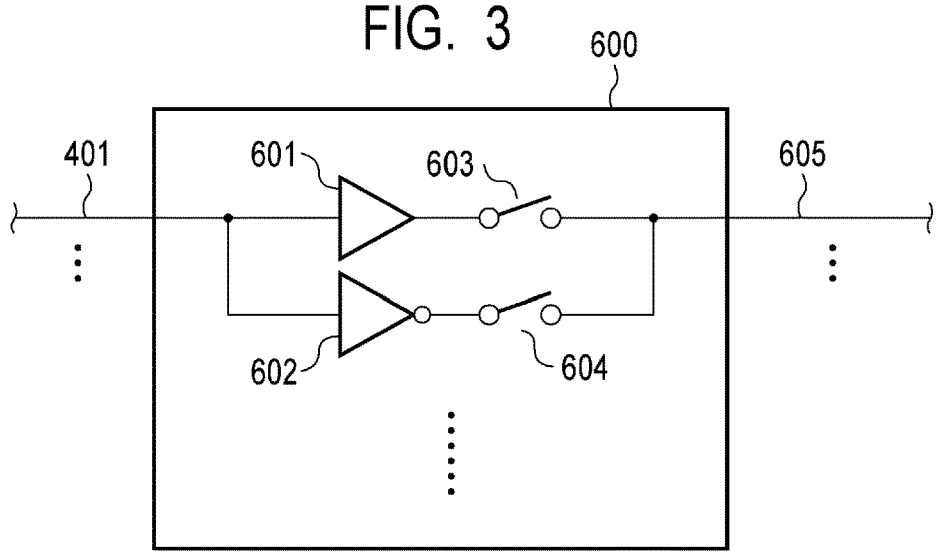
FIG. 3 is a schematic diagram illustrating a configuration example of a digital signal processing unit in the imaging device according to the first embodiment of the present invention.

First, a general configuration of the imaging device according to the present embodiment will be described by using FIG. 1 to FIG. 3. FIG. 1 is a block diagram illustrating a general configuration of an imaging device according to the present embodiment. FIG. 2 is a schematic diagram illustrating a configuration example of a digital memory group in the imaging device according to the present embodiment. FIG. 3 is a schematic diagram illustrating a configuration example of a digital signal processing unit in the imaging device according to the present embodiment.

As illustrated in FIG. 1, an imaging device 1000 according to the present embodiment includes a pixel array 100, a pixel drive unit 200, a signal processing unit 300, a digital memory group 400, and a horizontal scanning unit 500. Further, the imaging device 1000 further includes a digital signal processing unit 600, a parallel/serial (P/S) conversion unit 700, a signal output unit 800, and a control unit 900. These components of the imaging device 1000 may be, but not particularly limited thereto, formed on a single semiconductor substrate, for example.

The pixel array 100 includes a plurality of pixels 101 arranged in a matrix over a plurality of rows and a plurality of columns. The number of pixels 101 forming the pixel array 100 is not particularly limited. In the present specification, the pixel array 100 including a plurality of pixels 101 arranged in a matrix of n rows by m columns is assumed, and these variables n and m may be used for illustration.

On each row of the pixel array 100, pixel drive signal lines 201 are arranged extending in a first direction (the horizontal direction in FIG. 1). Each pixel drive signal line 201 is connected to the pixels 101 aligned in the first direction, respectively, and forms a signal line common to these pixels 101. The first direction in which the pixel drive signal line 201 extends may be referred to as a row direction. The pixel drive signal line 201 on each row is connected to the pixel drive unit 200.

On each column of the pixel array 100, pixel output lines 202 are arranged extending in a second direction (the vertical direction in FIG. 1) intersects the first direction. Each pixel output line 202 is connected to the pixels 101 aligned in the second direction, respectively, and forms a signal line common to these pixels 101. The second direction in which the pixel output line 202 extends may be referred to as a column direction. The pixel output line 202 on each column is connected to the signal processing unit 300.

The signal processing unit 300 includes a plurality of column signal processing units 310 provided in association with respective columns of the pixel array 100. The pixel output line 202 on each column is connected to the column signal processing unit 310 on the corresponding column. The column signal processing unit 310 on each column is connected to the digital memory group 400 via signal processing output lines 301 on the corresponding column.

The digital memory group 400 includes a plurality of digital memory units 410 and 420 provided in association with respective columns of the pixel array 100. The column signal processing unit 310 on each column of the signal processing unit 300 is connected to one of the digital memory unit 410 and the digital memory unit 420 via the signal processing output line 301 on the corresponding column. The digital memory units 410 and 420 on respective columns are connected to the digital signal processing unit 600 via a common output line 401.

The horizontal scanning unit 500 is connected to the digital memory unit 410 or the digital memory unit 420 on the corresponding columns via select signal lines 501 provided in association with respective columns of the pixel array 100. The digital signal processing unit 600 is connected to the P/S conversion unit 700 via a digital signal processing output line 605. The P/S conversion unit 700 is connected to the signal output unit 800. The control unit 900 is connected to the pixel drive unit 200, the signal processing unit 300, the digital memory group 400, the horizontal scanning unit 500, the digital signal processing unit 600, and the like.

Note that each of the signal processing output lines 301, the common output line 401, and the digital signal processing output line 605 are signal lines for outputting an N-bit digital signal (N is a natural integer) and are formed of N signal lines corresponding to the number of bits of a digital signal.

As illustrated in FIG. 2, the digital memory group 400 includes the plurality of digital memory units 410 and 420 provided in association with respective columns of the pixel array 100. The digital memory units 410 and 420 are arranged alternately on a column basis. For example, the digital memory units 410 are arranged on odd-numbered columns, and the digital memory units 420 are arranged on even-numbered columns. Alternatively, the digital memory units 420 are arranged on odd-numbered columns, and the digital memory units 410 are arranged on even-numbered columns. In FIG. 2, the digital memory units 410 and 420 for six consecutive columns are picked out and illustrated out of the digital memory units 410 and 420 on the m columns forming the digital memory group 400. In FIG. 2, for simplified illustration, detailed illustration of the digital memory units 410 and 420 from the third column to the sixth column is omitted.

Each of the digital memory units 410 includes N-bit digital memory cells 402 and buffers 404 and tristate buffers 405 provided in association with respective bits of the digital memory cells 402.

The digital memory cells 402 of the digital memory unit 410 are connected to the signal processing output line 301 on the corresponding column. The N signal lines of the signal processing output line 301 from which an N-bit digital pixel signal is output are connected to respective bits of the N-bit digital memory cells 402. Each bit of the digital memory cells 402 is connected to the input terminal of the buffer 404 via a digital memory cell output line 403. The output terminal of the buffer 404 is connected to the input terminal of the tristate buffer 405. The output terminal of the tristate buffer 405 is connected to a signal line of the corresponding bit out of N signal lines of the common output line 401 to which an N-bit signal is output. The select signal line 501 is connected to each bit of the digital memory cells 402. A buffer control line 406 is connected to each tristate buffer 405, and the tristate buffer 405 can be controlled by a buffer control signal supplied from the control unit 900.

Each of the digital memory units 420 includes N-bit digital memory cells 402 and inverters 407 and tristate buffers 405 provided in association with respective bits of the digital memory cells 402.

The digital memory cells 402 of the digital memory unit 420 are connected to the signal processing output line 301 on the corresponding column. The N signal lines of the signal processing output line 301 from which an N-bit digital pixel signal is output are connected to respective bits of the N-bit digital memory cells 402. Each bit of the digital memory cells 402 is connected to the input terminal of the inverter 407 via a digital memory cell output line 403. The output terminal of the inverter 407 is connected to the input terminal of the tristate buffer 405. The output terminal of the tristate buffer 405 is connected to a signal line of the corresponding bit out of N signal lines of the common output line 401 to which an N-bit signal is output. The select signal line 501 is connected to each bit of the digital memory cells 402. A buffer control line 406 is connected to each tristate buffer 405, and the tristate buffer 405 can be controlled by a buffer control signal supplied from the control unit 900. The inverter 407 has a function of a bit value inversion unit that inverts a value of each bit of data held by the digital memory cells 402.

An N-bit digital pixel signal output from the column signal processing unit 310 on each column of the signal processing unit 300 via the signal processing output line 301 is held in the digital memory cell 402 of the digital memory unit 410 or the digital memory unit 420 on the corresponding column.

A control signal (a column select signal) supplied from the horizontal scanning unit 500 via the select signal line 501 is input in parallel to respective bits of the digital memory cells 402. In response to receiving a controls signal from the horizontal scanning unit 500, the digital memory cells 402 of the digital memory unit 410 output digital values of respective bits to the common output line 401 via the digital memory cell output lines 403, the buffers 404, and the tristate buffers 405. In response to receiving a controls signal from the horizontal scanning unit 500, the digital memory cells 402 of the digital memory unit 420 output digital values of respective bits to the common output line 401 via the digital memory cell output lines 403, the inverters 407, and the tristate buffers 405. The tristate buffer 405 is configured to be able to control the output to a high impedance state in response to a control signal supplied via the buffer control line 406 and is controlled so that the output is in a high impedance state when other columns are selected.

The digital signal processing unit 600 includes a plurality of processing circuits corresponding to respective N signal lines forming the common output line 401. FIG. 3 illustrates a configuration example of a processing circuit connected to one signal line of N signal lines forming the common output line 401. The digital signal processing unit 600 includes N processing circuits corresponding to N signal lines forming the common output line 401 in the actual implementation. The same applies to the connection between N processing circuits of the digital signal processing unit 600 and the digital signal processing output line 605.

As illustrated in FIG. 3, the processing circuit of the digital signal processing unit 600 includes a buffer 601, an inverter 602, and switches 603 and 604. The input terminals of the buffer 601 and the inverter 602 are connected to the common output line 401. The output terminal of the buffer 601 is connected to the digital signal processing output line 605 via the switch 603. The output terminal of the inverter 602 is connected to the digital signal processing output line 605 via the switch 604. The switches 603 and 604 are controlled by control signals supplied from the control unit 900. For example, the switch 603 is turned on (a conductive state) when a control signal is high and turned off (a nonconductive state) when the control signal is low, and the switch 604 is turned on (a conductive state) when a control signal is high and turned off (a nonconductive state) when the control signal is low.

A digital signal input from the digital memory units 410 and 420 to the digital signal processing unit 600 via the common output line 401 is input to the buffer 601 and the inverter 602. One of the output signal of the buffer 601 and the output signal of the inverter 602 which is selected by the switches 603 and 604 is transferred to the P/S conversion unit 700 via the digital signal processing output line 605.

Next, a general operation of the imaging device according to the present embodiment will be described by using FIG. 1 to FIG. 6.

Each of the pixels 101 includes a photoelectric conversion unit formed of a photoelectric conversion element such as a photodiode and converts an incident light into an electric signal (a pixel signal) in accordance with the light amount thereof. The pixel drive unit 200 supplies, to the pixel 101 via the pixel drive signal line 201, a control signal used for driving a readout circuit (not illustrated) within the pixel 101 when reading out a pixel signal from the pixel 101. The pixel drive unit 200 controls reset of the pixel 101, photoelectric conversion, transfer of charges, selection of a row from which a pixel signal is output, or the like by using control signals supplied via the pixel drive signal line 201. Thereby, each of the pixels 101 outputs a pixel signal based on the amount of charges generated by the photoelectric conversion unit to the pixel output line 202 on the corresponding column in response to a control signal supplied from the pixel drive signal line 201 on the corresponding row. The plurality of pixels 101 belonging to a row selected by the pixel drive unit 200 simultaneously output pixel signals to the pixel output lines 202 on the corresponding columns.

The pixel signal output to the pixel output line 202 is input to the column signal processing unit 310 on the corresponding column, and predetermined signal processing is performed thereon in the column signal processing unit 310. Each of the column signal processing unit 310 includes at least an analog-to-digital (A/D) converter and converts a pixel signal, which is an analog signal, into an N-bit digital signal. The digital pixel signal processed by the column signal processing unit 310 on each column is input to the digital memory unit 410 or the digital memory unit 420 on the corresponding column via the signal processing output line 301 on the corresponding column.

The column signal processing unit 310 may further have a function other than A/D conversion. Another function that may be provided to the column signal processing unit 310 may be, for example, a function of amplifying a pixel signal, a function of performing correlated double sampling (CDS), and a function of performing sample and hold (S/H) on a pixel signal.

The digital memory unit 410 or the digital memory unit 420 on each column holds a digital pixel signal supplied from the column signal processing unit 310 on the corresponding column via the signal processing output line 301. The horizontal scanning unit 500 may be formed of a decoder or a shift register. The horizontal scanning unit 500 supplies, to the digital memory units 410 and 420 via the select signal line 501, a control signal used for transferring digital data held in the digital memory units 410 and 420 to the digital signal processing unit 600 sequentially on a column basis. The horizontal scanning unit 500 is a transfer unit that sequentially outputs digital data held in each of the digital memory units 410 and 420 to the common output line 401. The digital memory units 410 and 420 that have received the control signal from the horizontal scanning unit 500 transfer digital data held therein to the digital signal processing unit 600 via the common output line 401.

The digital signal processing unit 600 performs predetermined signal processing on digital data received from the digital memory group 400. The signal processing performed by the digital signal processing unit 600 may be, for example, digital signal processing such as addition and subtraction of digital gain or offset, decoding, a scrambling process of data, or the like. In the present embodiment, the digital signal processing unit 600 has a function as a decode processing unit that performs a decode process to restore a bit value inverted by the bit value inversion unit or performs a decode process to restore a scrambling process performed on digital data by the scrambling unit.

The digital data on which digital signal processing is performed in the digital signal processing unit 600 is transferred to the P/S conversion unit 700 via the digital signal processing output line 605 and then output to the outside of the imaging device 1000 via the signal output unit 800. The signal output unit 800 has an external interface of a scheme of outputting a voltage from a single terminal as with a buffer circuit or a Low Voltage Differential Signaling (LVDS) scheme having two differential terminals, for example.

The control unit 900 supplies, to the pixel drive unit 200, the signal processing unit 300, the digital memory group 400, the horizontal scanning unit 500, the digital signal processing unit 600, and the like, control signals used for controlling the operations of these units or the timings thereof. At least some of the control signals supplied from the control unit 900 may be supplied from the outside of the imaging device 1000.

Figure 4:
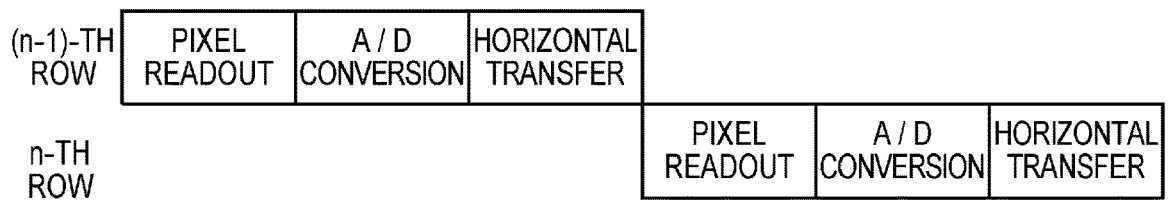
FIG. 4, FIG. 5 and FIG. 6 are schematic diagrams illustrating a form of driving in the imaging device according to the first embodiment of the present invention.
Figure 5:
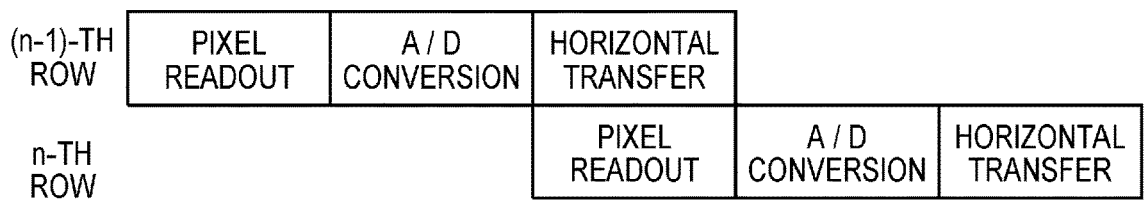
Figure 6:
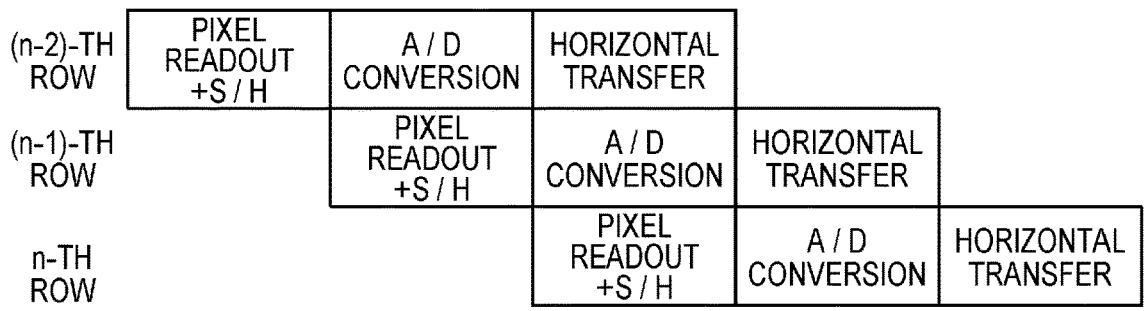

FIG. 4 to FIG. 6 are schematic diagrams illustrating a form of driving in the imaging device according to the present embodiment. In FIG. 4 and FIG. 5, the item "pixel readout" indicates an operation until a pixel signal is read out from the pixel 101 to the pixel output line 202. In FIG. 6, the item "pixel readout+S/H" indicates an operation until a pixel signal is read out from the pixel 101 and sampled and held in the sample-hold (S/H) circuit of the column signal processing unit 310. In FIG. 4 to FIG. 6, the item "A/D conversion" indicates an operation until A/D conversion is performed on a pixel signal by the column signal processing unit 310 and the digitally converted signal is stored in the digital memory unit 410 or the digital memory unit 420. In FIG. 4 to FIG. 6, the item "horizontal transfer" indicates an operation until a pixel signal held in the digital memory unit 410 or the digital memory unit 420 is output from the signal output unit 800. In FIG. 4 to FIG. 6, the vertical direction represents a row position in the pixel array 100, and the horizontal direction represents time. The length in the horizontal direction of each block substantially indicates one horizontal period.

FIG. 4 is a form of driving in which "pixel readout", "A/D conversion", and "horizontal transfer" are defined as a series of signal processing and, after the series of signal processing on the previous row (for example, the (n−1)-th row) is completed, the series of signal processing on the next row (for example, the n-th row) is started. The operations of reset, photoelectric conversion, and accumulation in the pixel 101 are performed after the end of "pixel readout" on the previous row and before the start of "pixel readout" on the next row.

FIG. 5 illustrates a form of driving in which, out of the series of signal processing on each row, "horizontal transfer" on the previous row (for example, the (n−1)-th row) and "pixel readout" on the next row (for example, the n-th row) are performed at the same timing.

Since the operation of "pixel readout" does not affect signal processing of horizontally transferred digital data, "horizontal transfer" on the previous row and "pixel readout" on the next row can be started at the same time and performed in parallel. Such configuration can shorten the time required for readout of all the rows.

FIG. 6 illustrates a form of driving in which "pixel readout+S/H", "A/D conversion", and "horizontal transfer" are defined as a series of signal processing and "A/D conversion" on the previous row (for example, the (n−2)-th row) and "pixel readout+S/H" on the next row (for example, the (n−1)-th row) are performed at the same timing. In more detail, "horizontal transfer" on the previous row (for example, the (n−2)-th row), "A/D conversion" on the next row (for example, the (n−1)-th row), and "pixel readout+S/H" on the following next row (for example, the n-th row) are performed at the same timing in parallel.

Here, the column signal processing unit 310 includes the S/H circuit on the pre-stage of the A/D conversion unit. When the column signal processing unit 310 includes the S/H circuit on the pre-stage of the A/D conversion unit, it is possible to perform "A/D conversion" on the previous row and "pixel readout+S/H" on the next row at the same timing. While "pixel readout+S/H" is used as one operation unit for simplified illustration in FIG. 7, "S/H" operation on the next row is started after the end of "A/D conversion" on the previous row in a strict sense. With such a configuration, "A/D conversion" on the previous row and "pixel readout" on the next row can be performed at the same timing.

Further, the digital memory group 400 further includes a digital memory unit used for holding digital data obtained by A/D conversion in the column signal processing unit 310 and another digital memory unit for readout used for holding the obtained digital data. With the digital memory group 400 having two systems of digital memory units, it is possible to store digital data obtained by A/D conversion in the other digital memory unit while reading out digital data from one digital memory unit. Thereby, it is possible to perform "horizontal transfer" on the previous row and "A/D conversion" on the next row in parallel at the same timing. With such a configuration, it is possible to further shorten the time required for readout of all the rows.

Next, the detailed operation of the imaging device according to the present embodiment will be described by using FIG. 7 to FIG. 20 in comparison with an operation of an imaging device according to a reference example.

Figures 7, 8:
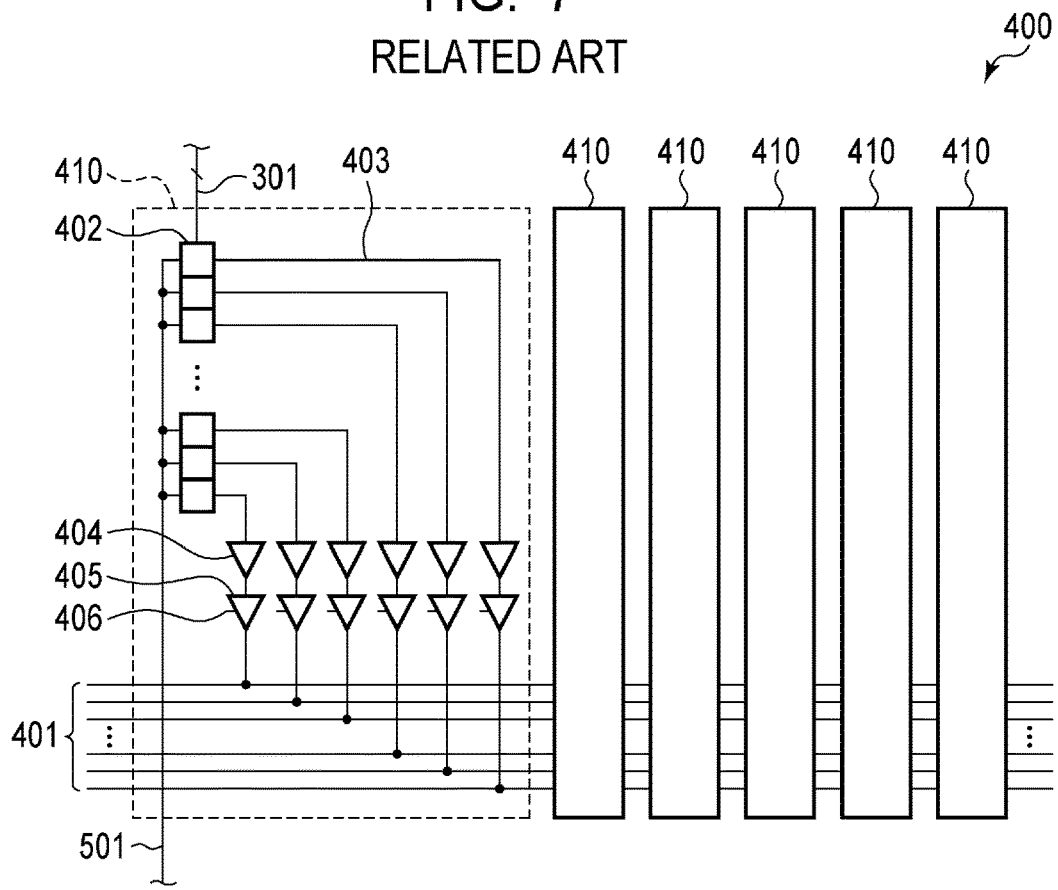
FIG. 7 is a schematic diagram illustrating a configuration example of a digital memory group in an imaging device according to a reference example.
FIG. 8 is a diagram schematically illustrating data values on signal paths from the digital memory group to a digital signal processing output line of the imaging device according to the reference example.

FIG. 7 is a schematic diagram illustrating a configuration example of the digital memory group 400 in the imaging device according to the reference example. The basic configuration of the imaging device according to the reference example is the same as that of the imaging device according to the present embodiment except that the configuration of the digital memory group 400 is different. As illustrated in FIG. 7, the digital memory group 400 of the imaging device according to the reference example includes a plurality of digital memory units 410 provided in association with respective columns of the pixel array 100. In FIG. 7, the digital memory units 410 for six consecutive columns are picked out and illustrated out of the digital memory units 410 on the m columns forming the digital memory group 400. In FIG. 7, for simplified illustration, detailed illustration of the digital memory units 410 from the second column to the sixth column is omitted. Since each of the digital memory units 410 in the digital memory group 400 of the imaging device according to the reference example is the same as the digital memory unit 410 in the digital memory group 400 of the imaging device according to the present embodiment illustrated in FIG. 2, the detailed description thereof will be omitted.

FIG. 8 is a diagram schematically illustrating data values on signal paths from the digital memory group 400 to a digital signal processing output line 605 of the imaging device according to the reference example. Here, data held in each bit of the digital memory cell 402 as a result of A/D conversion by the column signal processing unit 310 is expressed by "0" and "1".

In FIG. 8, the item "digital memory cell 402" indicates data values held in a particular bit of the digital memory cells 402 on consecutive six columns. For example, each value of 0, 0, 1, 1, 0, 0 illustrated in FIG. 8 is a data value held in a particular bit of each of the digital memory cells 402 on six columns illustrated in FIG. 7.

The item "common output line 401" indicates data values on a signal line corresponding to the particular bit of interest of the common output line 401 when data held in the digital memory cells 402 on respective columns are sequentially output to the common output line 401. For example, each value of 0, 0, 1, 1, 0, 0 illustrated in FIG. 8 indicates that the data value on the signal line of interest of the common output line 401 transitions in this order.

The items "switch 603" and "switch 604" indicate signal levels of control signals to the switches 603 and 604. For example, when the signal level of interest is a high level, the corresponding switch is in an on-state. Further, when the signal level of interest is a low level, the corresponding switch is in an off-state. Here, the switch 603 is controlled to an on-state by a high-level control signal, and the switch 604 is controlled to an off-state by a low-level control signal.

The item "digital signal processing output line 605" illustrates data values on a signal line corresponding to the particular bit of interest of the digital signal processing output line 605. For example, each value of 0, 0, 1, 1, 0, 0 illustrated in FIG. 8 indicates that the data value on the signal line of interest of the digital signal processing output line 605 transitions in this order.

Figure 9:
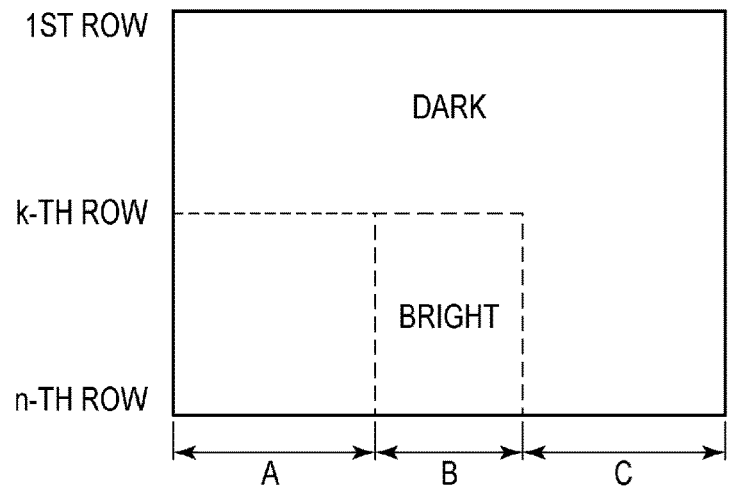
FIG. 9 is a schematic diagram illustrating one example of an object.

It is here assumed that an object illustrated in FIG. 9 is used as one example of an object captured by the pixel array 100. The object illustrated in FIG. 9 includes a dark region and a bright region. When the pixel array 100 is divided into a range A, a range B, and a range C defined by columns as illustrated in FIG. 9, the ranges A, B, and C on the first row to the k-th row and the ranges A and C on the k-th row to the n-th row correspond to a dark region, and the range B on the k-th row to the n-th row corresponds to a bright region.

Figure 10:
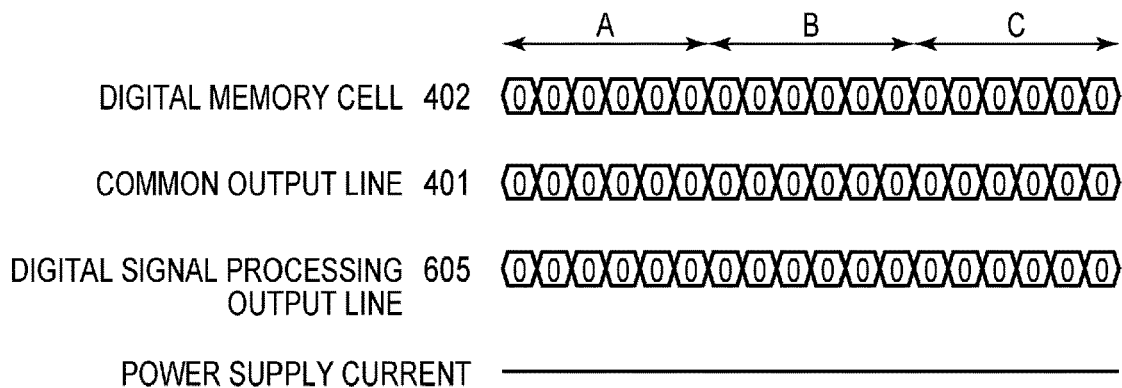
FIG. 10 and FIG. 11 are diagrams schematically illustrating data values on signal paths from the digital memory group to the digital signal processing output line when the object of FIG. 9 is captured by the imaging device according to the reference example.
Figure 11:
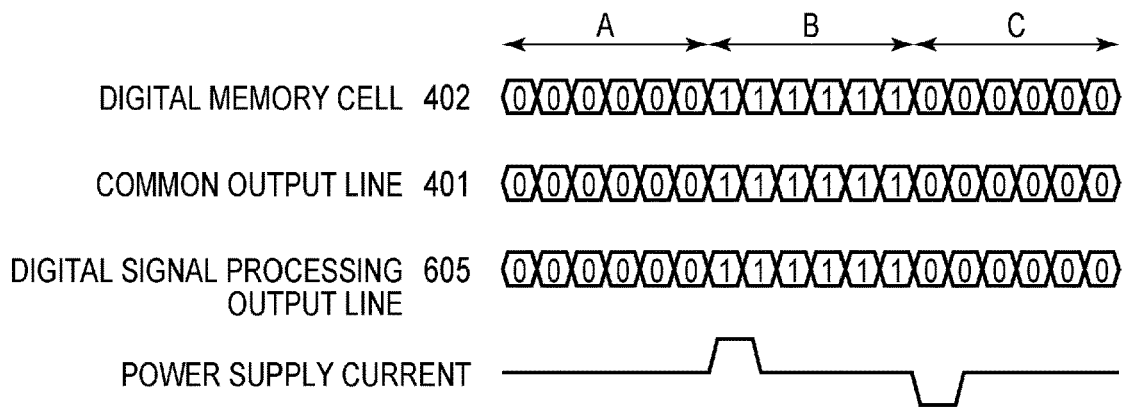

FIG. 10 and FIG. 11 are diagrams schematically illustrating data values on signal paths from the digital memory group 400 to the digital signal processing output line 605 when the object of FIG. 9 is captured by the imaging device according to the reference example. FIG. 10 and FIG. 11 illustrate data values held in a particular bit of the digital memory cells 402 of the digital memory units 410 on respective columns and the data values of interest on the common output line 401 and the digital signal processing output line 605 in the same manner as FIG. 8. Each data value held in the particular bit of interest of the digital memory cell 402 is "0" for a dark region and "1" for a bright region of FIG. 9.

In FIG. 10 and FIG. 11, the item "digital memory cell 402" indicates data values held in particular bit of the digital memory cells 402 on the consecutive 18 columns. It is here assumed that each of the ranges A, B, and C includes six columns. The item "common output line 401" indicates data values on a signal line corresponding to the particular bit of interest of the common output line 401. The item "digital signal processing output line 605" indicates data values on a signal line corresponding to the particular bit of interest of the digital signal processing output line 605. Further, FIG. 10 and FIG. 11 also illustrate the level of a power supply current of the tristate buffer 405. In FIG. 10 and FIG. 11, when the level of the power supply current changes, this indicates that the power supply current fluctuates.

FIG. 10 illustrates a case where the object of FIG. 9 is captured by the imaging device according to the reference example and digital data of the first row is transferred. In the object of FIG. 9, since all the columns of the ranges A, B, and C are dark on the first row, data held in the bit of interest of the digital memory cells 402 on all the columns are "0". Therefore, no transition of data occurs on the common output line 401 and the digital signal processing output line 605, and substantially no fluctuation of the power supply current due to driving of the tristate buffer 405 occurs.

FIG. 11 illustrates a case where the object of FIG. 9 is captured by the imaging device according to the reference example and digital data of the n-th row is transferred. In the object of FIG. 9, since the ranges A and C are dark and the range B is bright on the n-the row, "0" is held in the bit of interest of the digital memory cells 402 of the ranges A and C, and "1" is held in the bit of interest of the digital memory cells 402 of the range B. Therefore, on the common output line 401 and the digital signal processing output line 605, transition of data occurs at the timing of transition from a column of the range A to a column of the range B and the timing of transition from a column of the range B to a column of the range C. In this case, fluctuation of the power supply current due to driving of the tristate buffers 405 occurs at the timing when transition of data occurs.

Figure 12:
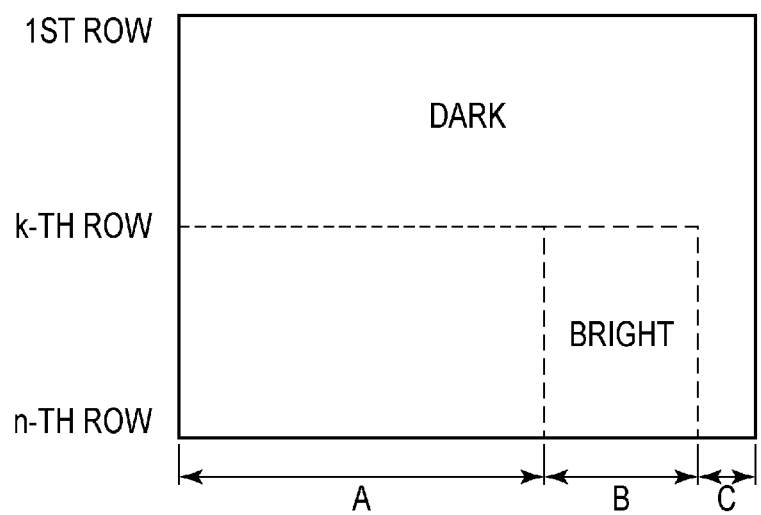
FIG. 12 is a schematic diagram illustrating another example of an object.
Figure 13:
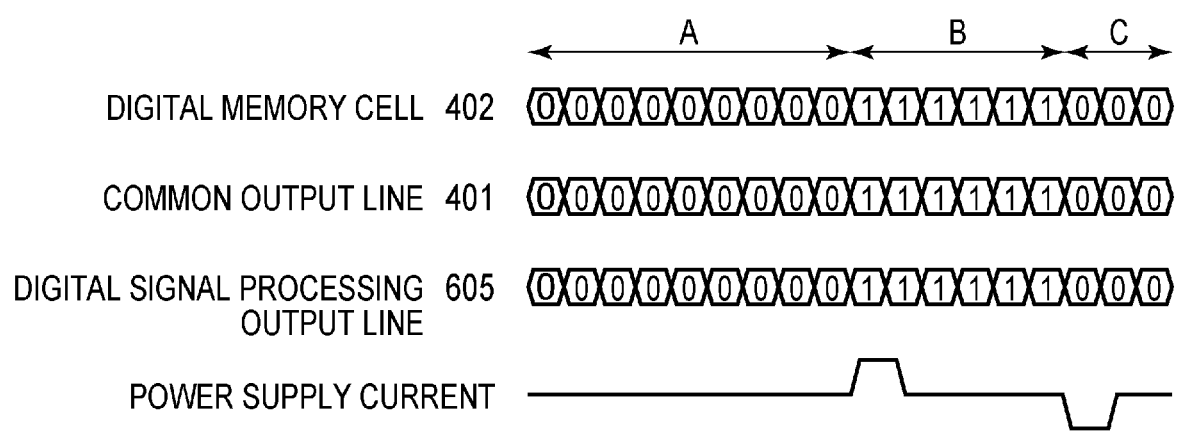
FIG. 13 is a diagram schematically illustrating data values on signal paths from the digital memory group to the digital signal processing output line when the object of FIG. 12 is captured by the imaging device according to the reference example.

FIG. 12 illustrates another example of an object captured by the pixel array 100. The object illustrated in FIG. 12 corresponds to a state where the bright region has moved in parallel in the row direction from the state of FIG. 9. FIG. 13 illustrates a case where the object of FIG. 12 is captured by the imaging device according to the reference example and digital data of the n-th row is transferred.

Also when the object of FIG. 12 is captured, the basic operation is the same as the case where the object of FIG. 9 is captured as illustrated in FIG. 13. However, in response to a change of data held in the digital memory cell 402, the timing when data transitions on the common output line 401 and the digital signal processing output line 605 changes, and the timing when fluctuation of a power supply current occurs changes.

FIG. 14 is a diagram illustrating a relationship between the form of driving illustrated by using FIG. 6 and fluctuation of the power supply current in the tristate buffers 405 illustrated by using FIG. 10 and FIG. 11. In FIG. 14, the first row to the third row correspond to rows from the first row to the k-th row of FIG. 9, for example, and the (n−2)-th row to the n-th row correspond to rows from the k-th row to the n-th row of FIG. 9, for example.

When the form of driving in FIG. 6 is applied, as illustrated in FIG. 14, a horizontal transfer operation of the first row, an A/D conversion operation of the second row, and a pixel readout and S/H operation of the third row are performed at the same timing. Further, a horizontal transfer operation of the second row, an A/D conversion operation of the third row, and a pixel readout and S/H operation on the fourth row (not illustrated) are performed at the same timing. Further, a horizontal transfer operation of the (n−2)-th row, an A/D conversion operation of the (n−1)-th row, and a pixel readout and S/H operation on the n-th row are performed at the same timing. Further, a horizontal transfer operation of the (n−1)-th row and an A/D conversion operation of the n-th row are performed at the same timing.

As with the form of driving in FIG. 6, when signal processing operations on a plurality of rows are performed in parallel to realize high rate readout, fluctuation of the power supply current due to a horizontal transfer operation may affect a readout operation on another row. For example, in an S/H operation, a signal on the S/H capacitor may change due to crosstalk at the time of sampling, the signal may be held before stabilized, and as a result, an error may occur in an A/D-converted pixel signal. Further, a reference comparison voltage or a bias voltage may change due to the crosstalk at the time of A/D conversion, and an A/D conversion error may occur.

When the object of FIG. 9 is captured by the imaging device according to the reference example, as described by using FIG. 10, there is substantially no fluctuation of the power supply current due to the horizontal transfer operation of the first row. In the horizontal transfer operation of the (n−2)-th row, however, as described by using FIG. 11, fluctuation of the power supply current may occur. For example, when an error of an A/D conversion result occurs due to crosstalk caused by fluctuation of the power supply current, no A/D conversion error occurs on the first to third rows, and an A/D conversion error occurs on the (n−2)-th row to the n-th row. That is, while the ranges A, B, and C on the first row to the k-th row and the ranges A and C on the k-th row to the n-th row are the same dark region and pixel signals of the same level are output from the pixels 101, A/D conversion results will be different. This is observed as a noise in a dark region on the same row as the row irradiated with a light, and a problem of image quality called a smear in general may occur in an image output from an imaging device.

Further, as described by using FIG. 12 and FIG. 13, the timing when fluctuation of the power supply current occurs in accordance with an image of an object. When the timing when crosstalk occurs changes in an S/H operation or an A/D conversion operation, the way of occurrence of an error changes. For example, with respect to an A/D conversion error, an error amount of a conversion value changes due to a difference in the pattern between FIG. 9 and FIG. 12. That is, the level of smear changes in accordance with the position of a bright region. This means that it is necessary to take position information on a bright part or a dark part of an object into consideration when trying to correct smear, however, it is difficult to perform such correction.

Note that fluctuation of the power supply current may occur not only in the tristate buffer 405 but also in the digital signal processing unit 600 or the P/S conversion unit 700. Also in the digital signal processing unit 600 or the P/S conversion unit 700, a change of a digital data value may cause the power supply current to fluctuate and cause the same crosstalk as in the tristate buffer 405.

A path of crosstalk may be a coupling capacitance existing in each of an impurity layer, an interconnection, or an element on a semiconductor substrate, electromagnetic wave noise due to a change in a current on the common output line 401 extending in the row direction, or the like. Further, a path of crosstalk exists on a package or a substrate outside the imaging device. Note that detailed description of crosstalk paths will be omitted.

FIG. 15 and FIG. 16 are diagrams schematically illustrating data values on signal paths from the digital memory group 400 to the digital signal processing output line 605 of the imaging device according to the present embodiment. Here, in the same manner as in the case of FIG. 8, data held in each bit of the digital memory cell 402 as a result of A/D conversion by the column signal processing unit 310 is expressed by "0" and "1".

In FIG. 15 and FIG. 16, the item "digital memory cell 402" indicates data values held in a particular bit of the digital memory cells 402 on consecutive six columns. For example, each value of 0, 0, 1, 1, 0, 0 illustrated in FIG. 15 and FIG. 16 is data values held in a particular bit of respective digital memory cells 402 on six columns illustrated in FIG. 2.

The item "common output line 401" indicates data values on a signal line corresponding to the particular bit of interest of the common output line 401 when data held in the digital memory cells 402 on respective columns are sequentially output to the common output line 401.

The items "switch 603" and "switch 604" indicate signal levels of control signals to the switches 603 and 604. For example, when the signal level of interest is a high level, the corresponding switch is in an on-state. Further, when the signal level of interest is a low level, the corresponding switch is in an off-state. Here, the switch 603 is controlled to an on-state by a high-level control signal, and the switch 604 is controlled to an off-state by a low-level control signal.

The item "digital signal processing output line 605" illustrates data values on a signal line corresponding to the particular bit of interest of the digital signal processing output line 605.

FIG. 15 illustrates a case where driving to control the switch 603 to an on-state by using a high-level control signal and the switch 604 to an off-state by using a low-level control signal is performed in the same manner as in the case of FIG. 8. The digital memory units 410 and 420 on respective columns are selected sequentially in accordance with the control signals from the horizontal scanning unit 500, and thereby data on a signal line corresponding to the particular bit of interest of the common output line 401 transitions in the order of 0, 1, 1, 0, 0, 1. When the control signal of the switch 603 is at the high level and the control signal of the switch 604 is at the low level, the switch 603 is in an on-state and the switch 604 is in an off-state, and the buffer 601 is selected. Thereby, data on the digital signal processing output line 605 transitions in the order of 0, 1, 1, 0, 0, 1 in the same manner as the data on the signal line corresponding to the particular bit of interest of the common output line 401.

FIG. 16 illustrates a case where driving to alternately switch the control signals of the switches 603 and 604 between the high level and the low level in synchronization with a control signal supplied from the horizontal scanning unit 500 is performed. The digital memory units 410 and 420 on respective columns are sequentially selected in accordance with the control signals from the horizontal scanning unit 500, and thereby data on a signal line corresponding to the particular bit of interest of the common output line 401 transitions in the order of 0, 1, 1, 0, 0, 1. The switches 603 and 604 are alternately turned on as illustrated in FIG. 16, and thereby the buffer 601 and the inverter 602 are alternately selected. Thereby, data on the digital signal processing output line 605 transitions in the order of 0, 0, 1, 1, 0, 0.

As described above, in the case of the example of driving illustrated in FIG. 15, digital data held in the digital memory group 400 is inverted on every other column, transferred to the P/S conversion unit 700, and output to the outside of the imaging device 1000 from the signal output unit 800. It is thus necessary to perform a decode process outside the imaging device 1000 on the data output from the signal output unit 800.

On the other hand, in a case of the example of driving illustrated in FIG. 16, digital data held in the digital memory group 400 is inverted on every other column and output from the digital memory group 400, but again inverted on every other column in the digital signal processing unit 600 and transferred to the signal output unit 800. It is therefore not necessary to perform a decode process outside the imaging device 1000 on the data output from the signal output unit 800.

FIG. 17 illustrates a case where the object of FIG. 9 is captured by the imaging device according to the present embodiment and digital data on the first row are transferred. The switches 603 and 604 of the digital signal processing unit 600 are repeatedly turned on and off alternately in synchronization with a control signal supplied from the horizontal scanning unit 500 in the same manner as the case of the example of driving illustrated in FIG. 16.

Since all the columns of the ranges A, B, and C on the first row are dark in the object of FIG. 9, data held in the bit of interest of the digital memory cells 402 on all the columns are "0". In the configuration in which the digital memory group 400 includes the digital memory units 410 and 420, however, data output from the digital memory group 400 to the common output line 401 are inverted on a column basis. Therefore, data of 0 and data of 1 transition alternately on the common output line 401, and fluctuation of the power supply current due to driving of the tristate buffer 405 occurs. The data output to the common output line 401 are again inverted on a column basis in the digital signal processing unit 600 back to the original value and transferred to the signal output unit 800.

FIG. 18 illustrates a case where the object of FIG. 9 is captured by the imaging device according to the present embodiment and digital data on the n-th row are transferred. Also in the digital data transfer on the n-th row, data output from the digital memory group 400 to the common output line 401 are inverted on a column basis in the same manner as in the case of FIG. 17. Therefore, data of 0 and data of 1 transition alternately on the common output line 401, and fluctuation of the power supply current due to driving of the tristate buffer 405 occurs. The data output to the common output line 401 are again inverted on a column basis in the digital signal processing unit 600 back to the original value and transferred to the signal output unit 800.

Figure 19:
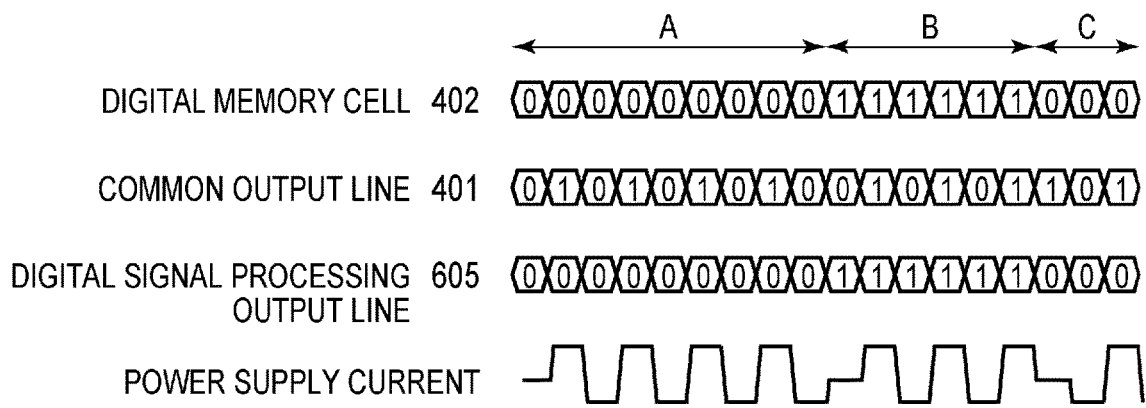
FIG. 19 is a diagram schematically illustrating data values on signal paths from the digital memory group to the digital signal processing output line when the object of FIG. 12 is captured by the imaging device according to the first embodiment of the present invention.

FIG. 19 illustrates a case where the object of FIG. 12 is captured by the imaging device according to the present embodiment and digital data on the n-th row are transferred. Also in the case where the object of FIG. 12 is captured, the basic operation is the same as that in the case where the object of FIG. 9 is captured, as illustrated in FIG. 19. However, a change of data held in the digital memory cell 402 causes a change of the timing when data transitions on the common output line 401 and the digital signal processing output line 605 and also causes a change of the timing when fluctuation of a power supply current occurs.

Figure 20:
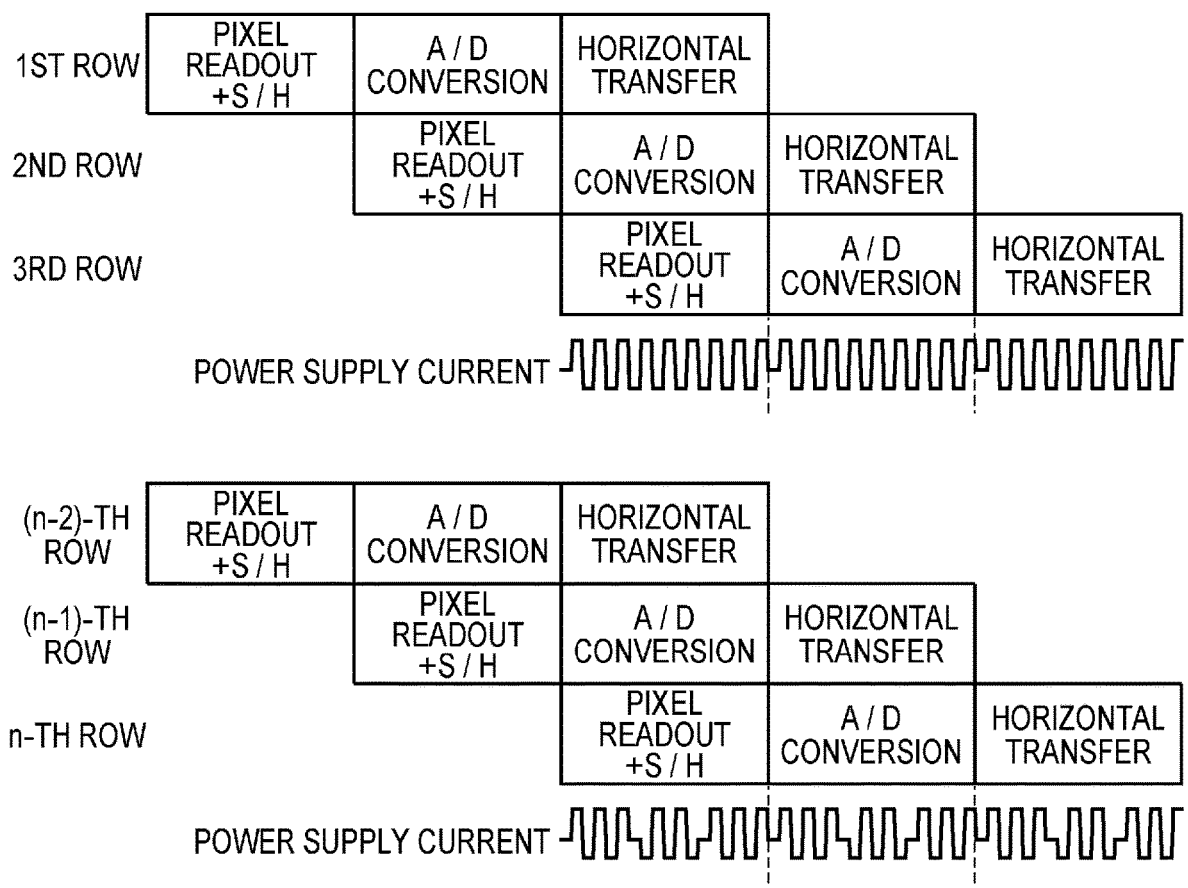
FIG. 20 is a diagram illustrating a relationship between a drive timing and a power supply current in the imaging device according to the first embodiment of the present invention.

FIG. 20 is a diagram illustrating a relationship between the form of driving illustrated by using FIG. 6 and fluctuation of the power supply current in the tristate buffers 405 illustrated by using FIG. 17 and FIG. 18. In FIG. 20, the first row to the third row correspond to rows from the first row to the k-th row of FIG. 9, for example, and the (n−2)-th row to the n-th row correspond to rows from the k-th row to the n-th row of FIG. 9, for example.

When the object of FIG. 9 is captured by the imaging device according to the present embodiment, fluctuation of the power supply current of the tristate buffer 405 occurs in the horizontal transfer operation on the first row to the third row, as described by using FIG. 17. Further, fluctuation of the power supply current of the tristate buffer 405 occurs also in the horizontal transfer operation on the (n−2)-th row to the n-th row, as described by using FIG. 18. That is, in the imaging device according to the present embodiment, an A/D conversion error occurs on both the first row to the third row and the (n−2)-th row to the n-th row.

In the imaging device according to the present embodiment, however, although there is a slight difference in fluctuation of the power supply current, the fluctuation of the power supply current is smoothed by the parasitic capacitance or the parasitic resistance of interconnections or elements. That is, the A/D conversion result including a conversion error on the first row to the third row and the A/D conversion result including a conversion error on the (n−2)-th row to the n-th row are substantially the same, and smear caused by the difference in the A/D conversion values can be reduced. Further, since fluctuation of the power supply current occurs regardless of brightness or darkness of the object, fluctuation of the power supply current that depends on the position of a bright part and a dark part of an object can also be reduced.

As described above, in the imaging device according to the present embodiment, digital data held in the digital memory group 400 is inverted on every other column and output on the common output line 401. In other words, a value of a bit of one of the first digital data and the second digital data that are sequentially output to the common output line 401 is inverted. This can suppress the specific fluctuation of the power supply current on the time axis of a signal processing operation and reduce deterioration of image quality that depends on the position of a bright part and a dark part of an object.

Note that, while digital data to be transferred is inverted on a column basis at the time of transferring digital data in the present embodiment, data may be converted by using a scrambler, an encoder, or the like that replaces an A/D conversion result with random data on a column basis. In such a case, a descrambler or a decoder may be arranged outside the digital signal processing unit 600 or the imaging device 1000 for restoring data conversion performed by a scrambler, an encoder, or the like. Note that a scrambling process performed by a scrambling unit (scrambler) may be, for example, a process of rearranging values of respective bits included in the digital data according to a predetermined scramble pattern, a process of inverting a value of a particular bit, or the like. The process of inverting the value of each bit described in the present embodiment is also one of the forms of a scrambling process.

Further, when an A/D conversion result is a binary code, only a higher order bit, such as the most significant bit (MSB) in which toggling of 0 and 1 is less likely to occur depending on an object may be inverted on a column basis, for example.

Further, while crosstalk at the time of a signal processing operation in the form of driving illustrated in FIG. 6 is focused on in the present embodiment, crosstalk may similarly occur in the examples of driving in FIG. 4 and FIG. 5. For example, in the case of the example of driving in FIG. 4, crosstalk may be caused by fluctuation of the power supply current at a particular timing on the time axis in a reset operation, a photoelectric conversion operation, or an accumulation operation of a pixel performed in a period from readout of one pixel to readout of the next pixel. The present embodiment can be applied to suppress the above crosstalk.

As described above, according to the present embodiment, it is possible to reduce image quality deterioration due to a change in a consumption current involved by a horizontal transfer operation of a digital signal.

Second Embodiment

Figure 21:
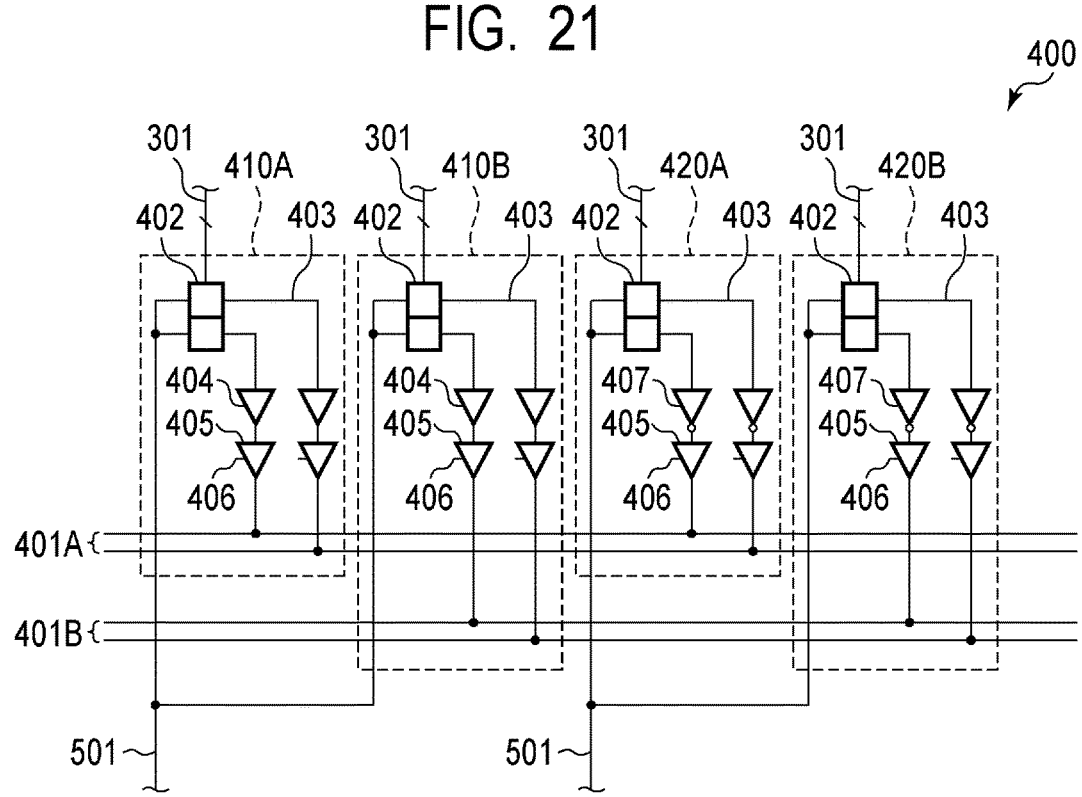
FIG. 21 is a schematic diagram illustrating a configuration example of a digital memory group in an imaging device according to a second embodiment of the present invention.

An imaging device according to a second embodiment of the present invention will be described with reference to FIG. 21. The same component as that in the imaging device according to the first embodiment is labeled with the same reference, and the description thereof will be omitted or simplified. FIG. 21 is a schematic diagram illustrating a configuration example of a digital memory group in the imaging device according to the present embodiment.

The basic configuration of the imaging device according to the present embodiment is the same as that of the imaging device according to the first embodiment except for the configuration of the digital memory group 400 and the common output line 401. That is, as illustrated in FIG. 21, the digital memory group 400 of the imaging device according to the present embodiment includes a plurality of digital memory units 410A, 410B, 420A, and 420B provided in association with respective columns of the pixel array 100. Further, the imaging device according to the present embodiment includes two pairs of common output lines 401A and 401B.

The digital memory units 410A, 410B, 420A, and 420B are arranged repeatedly in this order on respective columns. For example, the digital memory units 410A are arranged on the first column, the fifth column, . . . , the digital memory units 410B are arranged on the second column, the sixth column, . . . , the digital memory units 420A are arranged on the third column, the seventh column, . . . , and the digital memory units 420B are arranged on the fourth column, the eighth column, . . . .

Each of the digital memory units 410A and 410B includes the digital memory cell 402, the buffer 404, and the tristate buffer 405 in the same manner as the digital memory unit 410 in the digital memory group 400 of the imaging device according to the first embodiment. Each of the digital memory cells 402 of the digital memory units 410A and 410B is connected to the signal processing output line 301 on the corresponding column. The N signal lines of the signal processing output line 301 from which an N-bit digital pixel signal is output are connected to respective bits of the N-bit digital memory cells 402. Each bit of the digital memory cells 402 is connected to the input terminal of the buffer 404 via a digital memory cell output line 403. The output terminal of the buffer 404 is connected to the input terminal of the tristate buffer 405.

Each of the digital memory units 410A and 410B arranged on the adjacent columns forms a pair. The common select signal line 501 that supplies the same control signal is connected to the digital memory units 410A and 410B forming each pair. Each of the output terminals of the tristate buffers 405 of the digital memory units 410A is connected to a signal line of the corresponding bit out of N signal lines of the common output line 401A that outputs an N-bit signal. Further, each of the output terminals of the tristate buffers 405 of the digital memory units 410B is connected to a signal line of the corresponding bit out of N signal lines of the common output line 401B that outputs an N-bit signal.

Each of the digital memory units 420A and 420B includes the digital memory cell 402, the inverter 407, and the tristate buffer 405 in the same manner as the digital memory unit 420 in the digital memory group 400 of the imaging device according to the first embodiment. Each of the digital memory cells 402 of the digital memory units 420A and 420B is connected to the signal processing output line 301 on the corresponding column. The N signal lines of the signal processing output line 301 from which an N-bit digital pixel signal is output are connected to respective bits of the N-bit digital memory cells 402. Each bit of the digital memory cells 402 is connected to the input terminal of the inverter 407 via a digital memory cell output line 403. The output terminal of the inverter 407 is connected to the input terminal of the tristate buffer 405.

Each of the digital memory units 420A and 420B arranged on the adjacent columns forms a pair. The common select signal line 501 that supplies the same control signal is connected to the digital memory units 420A and 420B forming each pair. Each of the output terminals of the tristate buffers 405 of the digital memory units 420A is connected to a signal line of the corresponding bit out of N signal lines of the common output line 401A that outputs an N-bit signal. Further, each of the output terminals of the tristate buffers 405 of the digital memory units 420B is connected to a signal line of the corresponding bit out of N signal lines of the common output line 401B that outputs an N-bit signal.

With such a configuration, data held in the digital memory cells 402 of the digital memory units 410A and 410B can be read out in parallel to the common output lines 401A and 401B. Further, data held in the digital memory cells 402 of the digital memory units 420A and 420B can be read out in parallel to the common output lines 401A and 401B. Therefore, according to the imaging device of the present embodiment, it is possible to perform readout at a rate that is twice the rate of the imaging device of the first embodiment.

With a configuration of performing readout on a plurality of columns in parallel, the number of circuits in driving at the same time when digital data is transferred, for example, the number of tristate buffers 405 increases in accordance with the number of parallel connections, and fluctuation of the power supply current will also increase in accordance with the number of parallel connections. For example, when readout is performed on 10 columns in parallel in a configuration in which digital memory cells 402 for 12 bits are arranged, the number of signal lines forming the common output line 401 will be 12 by 10 parallel connections, namely, 120 in total. When a result of A/D conversion is a binary code, it is difficult to suppress an increase of fluctuation of the power supply current though not all the data of 12 bits necessarily changes and fluctuation of the power supply current may not simply 10 folds in the parallel readout of the 10 columns.

Thus, when the configuration of performing parallel readout on a plurality of columns is applied to the imaging device according to the reference example described by using FIG. 7, the difference in fluctuation of the power supply current becomes larger due to a difference in brightness of an object, and thus deterioration of image quality is likely to be more significant.

In this regard, in the imaging device according to the present embodiment, it is possible to suppress an influence due to fluctuation of the power supply current as described in the first embodiment. Therefore, according to the imaging device of the present embodiment, even when the imaging device is configured to perform parallel readout on a plurality of columns, an influence of fluctuation of the power supply current on the image quality can be effectively suppressed.

As described above, according to the present embodiment, it is possible to reduce image quality deterioration due to a change in a consumption current involved by a horizontal transfer operation of a digital signal.

Note that, while the configuration of performing parallel readout on every two columns has been described in the present embodiment, a configuration of performing parallel readout on every particular number, three or more, of columns is also possible. In such a case, data may be inverted on every column with respect to a column corresponding to each of the plurality of common output lines. With such a configuration, it is possible to perform readout at a rate that is three times the rate in the imaging device of the first embodiment.

Third Embodiment

Figure 22:
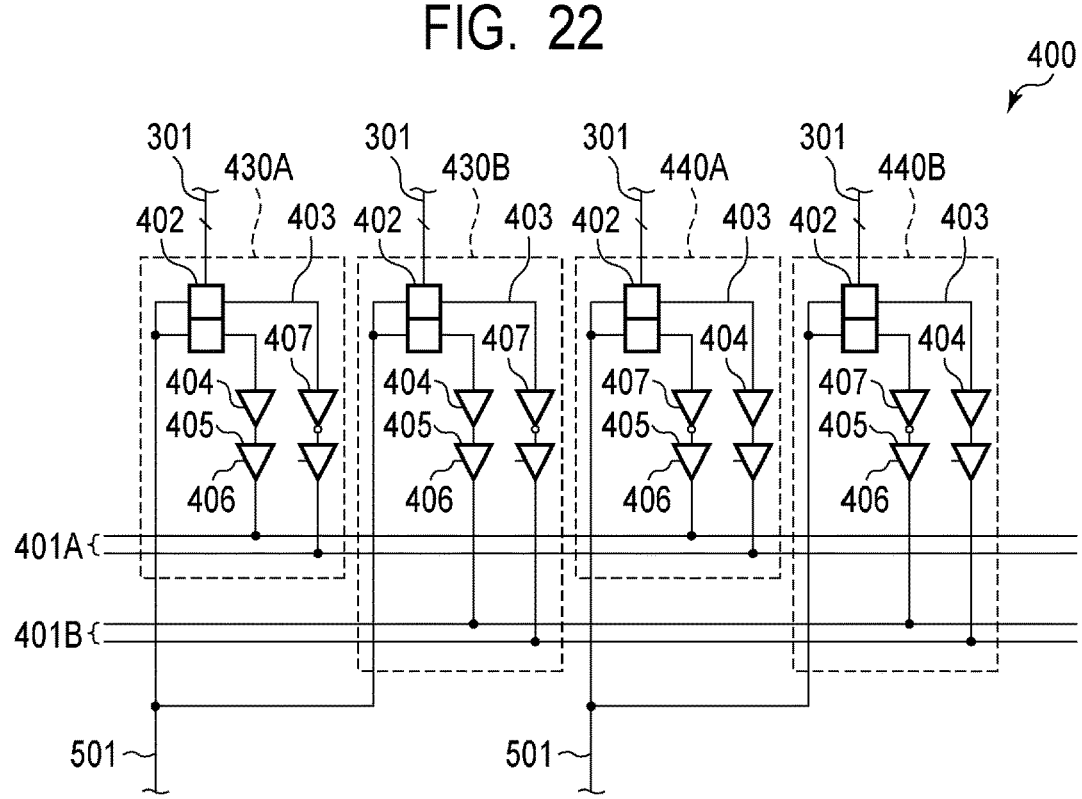
FIG. 22 is a schematic diagram illustrating a configuration example of a digital memory group in an imaging device according to a third embodiment of the present invention.

An imaging device according to a third embodiment of the present invention will be described by using FIG. 22. The same component as that in the imaging device according to the first and second embodiments is labeled with the same reference, and the description thereof will be omitted or simplified. FIG. 22 is a schematic diagram illustrating a configuration example of a digital memory group in the imaging device according to the present embodiment.

The basic configuration of the imaging device according to the present embodiment is the same as that of the imaging device according to the first embodiment except for the configuration of the digital memory group 400 and the common output line 401. That is, as illustrated in FIG. 22, the digital memory group 400 of the imaging device according to the present embodiment includes a plurality of digital memory units 430A, 430B, 440A, and 440B provided in association with respective columns of the pixel array 100. Further, the imaging device according to the present embodiment includes two pairs of common output lines 401A and 401B.

The digital memory units 430A, 430B, 440A, and 440B are arranged repeatedly in this order on respective columns. For example, the digital memory units 430A are arranged on the first column, the fifth column, . . . , the digital memory units 430B are arranged on the second column, the sixth column, . . . , the digital memory units 440A are arranged on the third column, the seventh column, . . . , and the digital memory units 440B are arranged on the fourth column, the eighth column, . . . . Each of the digital memory units 430A, 430B, 440A, and 440B includes the digital memory cell 402, the buffer 404, the inverter 407, and the tristate buffer 405.

Each of the digital memory units 430A and 430B arranged on the adjacent columns forms a pair. The common select signal line 501 that supplies the same control signal is connected to the digital memory units 430A and 430B forming each pair. Each of the output terminals of the tristate buffers 405 of the digital memory units 430A is connected to a signal line of the corresponding bit out of N signal lines of the common output line 401A that outputs an N-bit signal. Further, each of the output terminals of the tri state buffers 405 of the digital memory units 430B is connected to a signal line of the corresponding bit out of N signal lines of the common output line 401B that outputs an N-bit signal.

Similarly, each of the digital memory units 440A and 440B arranged on the adjacent columns forms a pair. The common select signal line 501 that supplies the same control signal is connected to the digital memory units 440A and 440B forming each pair. Each of the output terminals of the tristate buffers 405 of the digital memory units 440A is connected to a signal line of the corresponding bit out of N signal lines of the common output line 401A that outputs an N-bit signal. Further, each of the output terminals of the tri state buffers 405 of the digital memory units 440B is connected to a signal line of the corresponding bit out of N signal lines of the common output line 401B that outputs an N-bit signal.

Each of the digital memory units 410, 410A, and 410B described in the first and second embodiments includes the buffer 404 on the output path of digital data of each bit. Further, each of the digital memory units 420, 420A, and 420B described in the first and second embodiments includes the inverter 407 on the output path of digital data of each bit.

In contrast, each of the digital memory units 430A, 430B, 440A, and 440B in the present embodiment includes bits each having the buffer 404 on the output path of digital data and bits each having the inverter 407 on the output path of digital data. Further, the adjacent digital memory unit 430A and digital memory unit 440A are configured such that the bit having the buffer 404 and the bit having the inverter 407 are different from each other. For example, when the buffer 404 is arranged on the output path of the most significant bit of the digital memory unit 430A on the first column, the inverter 407 is arranged on the output path of the most significant bit of the digital memory unit 440A on the third column. The same applies to other bits. Further, the adjacent digital memory unit 430B and digital memory unit 440B are configured such that the bit having the buffer 404 and the bit having the inverter 407 are different from each other.

With such a configuration, digital data output via the buffer 404 and digital data output via the inverter 407 are alternately output to each of the signal lines forming the common output lines 401A and 401B. Therefore, the same advantage as that described in the first and second embodiments can be obtained with respect to fluctuation of the power supply current of the buffer 404 or the inverter 407.

Further, output values of the tristate buffers 405 are inverted on a bit basis, and thereby fluctuation of the power supply current described in the first embodiment occurs in the opposite phase, and fluctuation or crosstalk of the power supply involved by fluctuation of the power supply current can be cancelled. Thereby, deterioration of image quality can be reduced.

As described above, according to the present embodiment, it is possible to reduce image quality deterioration due to a change in a consumption current involved by a horizontal transfer operation of a digital signal.

Fourth Embodiment

Figures 23, 24:
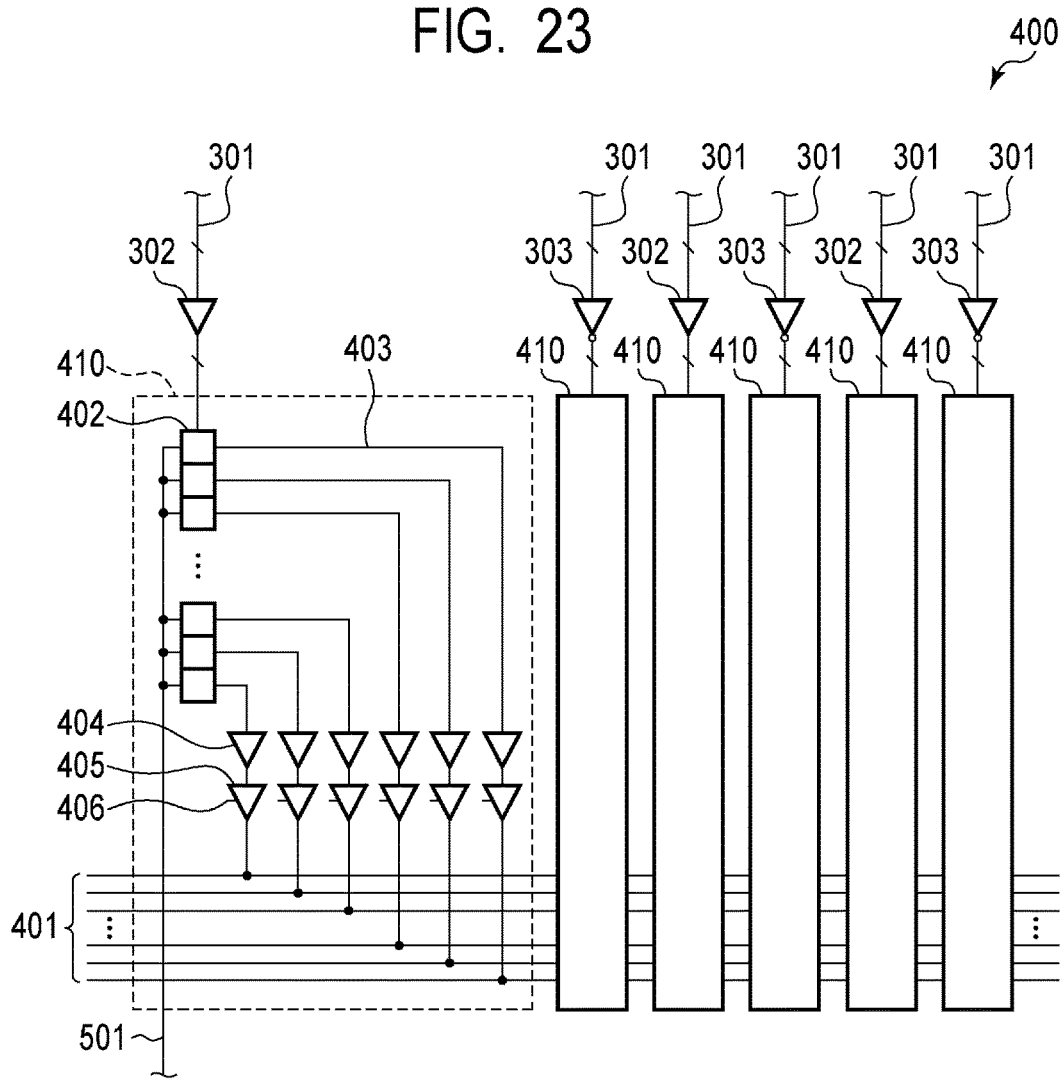
FIG. 23 is a schematic diagram illustrating a configuration example of a digital memory group in an imaging device according to a fourth embodiment of the present invention.
FIG. 24 is a diagram schematically illustrating data values on signal paths from the digital memory group to a digital signal processing output line in the imaging device according to the fourth embodiment of the present invention.

An imaging device according to a fourth embodiment of the present invention will be described with reference to FIG. 23 and FIG. 24. The same component as that in the imaging device according to the first to third embodiments is labeled with the same reference, and the description thereof will be omitted or simplified. FIG. 23 is a schematic diagram illustrating a configuration example of a digital memory group in the imaging device according to the present embodiment. FIG. 24 is a diagram schematically illustrating data values on signal paths from the digital memory group to a digital signal processing output line in the imaging device according to the present embodiment.

While an example in which an inversion process or a scrambling process of digital data is performed on the post-stage of the digital memory cell 402 has been described in the first to third embodiments, an inversion process or a scrambling process of digital data may not necessarily be required to be performed on the post-stage on the digital memory cell 402. In the present embodiment, an example in which an inversion process or a scrambling process of digital data is performed on the pre-stage of the digital memory cell 402 will be described.

The imaging device according to the present embodiment is the same as the imaging device according to the reference example described in the first embodiment except that a connection form between the signal processing unit 300 and the digital memory group 400 is different from that of the reference example. That is, in the imaging device according to the present embodiment, a buffer 302 or an inverter 303 is connected between the signal processing output line 301 and the digital memory unit 410 on each column, as illustrated in FIG. 23. The buffer 302 and the inverter 303 are arranged alternately on a column basis. The inverter 303 functions as a bit value inversion unit that inverts the value of each bit of data output from the column signal processing unit 310. Note that, in the present specification, the buffer 302 and the inverter 303 may be each described as a component of the signal processing unit 300 or the column signal processing unit 310.

While FIG. 23 illustrates that one buffer 302 or one inverter 303 is connected to each of the signal processing output lines 301, the buffer 302 or the inverter 303 is connected to each of the N signal lines forming the signal processing output line 301 in the actual implementation.

FIG. 24 is a diagram schematically illustrating data values on signal paths from the signal processing unit 300 to the digital signal processing output line 605 on the imaging device illustrated in FIG. 23.

In FIG. 24, "signal processing output line 301" indicates data values of a particular bit of digital pixel signals output from the column signal processing units 310 on the consecutive six columns to the signal processing output line 301. For example, each value of 0, 0, 1, 1, 0, 0 illustrated in FIG. 24 is the data value output from the signal line corresponding to the particular bit of each of the signal processing output lines 301 on the six columns illustrated in FIG. 23.

The item "digital memory cell 402" indicates data values input to the particular bit of interest of the digital memory cells 402 corresponding to the six columns of interest via the buffer 302 or the inverter 303. For example, each value of 0, 1, 1, 0, 0, 1 illustrated in FIG. 24 is a data value input to the particular bit of each of the digital memory cells 402 on the six columns illustrated in FIG. 24.

The item "common output line 401" indicates data values on a signal line corresponding to the particular bit of interest of the common output line 401 when data held in the digital memory cells 402 on respective columns are sequentially read out to the common output line 401. For example, each value of 0, 1, 1, 0, 0, 1 illustrated in FIG. 24 indicates that the data value on the signal line of interest of the common output line 401 transitions in this order.

The item "digital signal processing output line 605" indicates data values on a signal line corresponding to the particular bit of interest of the digital signal processing output line 605. For example, each value of 0, 0, 1, 1, 0, 0 illustrated in FIG. 24 indicates that the data value on the signal line of the digital signal processing output line 605 transitions in this order.

With such a configuration of the imaging device, out of digital pixel signals output from the signal processing unit 300, digital data of digital pixel signal on a predetermined column can be inverted and held in the digital memory cells 402. In the configuration example of FIG. 23, data held in the digital memory cells 402 are inverted on a column basis. Therefore, transition of data on the common output line 401 and fluctuation of the power supply current of the tristate buffer 405 are the same as those in the case of the imaging device according to the first embodiment (FIG. 16). That is, also in the imaging device according to the present embodiment, the same advantage as that of the imaging device according to the first embodiment can be obtained.

Note that, in the configuration example of FIG. 23, columns on which the buffer 302 is connected to all the N signal lines forming the signal processing output line 301 and columns on which the inverter 303 is connected to all the N signal lines forming the signal processing output line 301 are provided. However, out of the N signal lines forming the signal processing output line 301, some of the signal lines may be connected to the buffer 302, and some of the other signal lines may be connected to the inverter 303. Further, the number of elements may be reduced by not arranging the buffer 302 or the inverter 303 on signal paths connected to a bit where the frequency of change of the data value is high, such as the least significant bit (LSB).

As described above, according to the present embodiment, it is possible to reduce image quality deterioration due to a change in a consumption current involved by a horizontal transfer operation of a digital signal.

Fifth Embodiment

Figure 25:
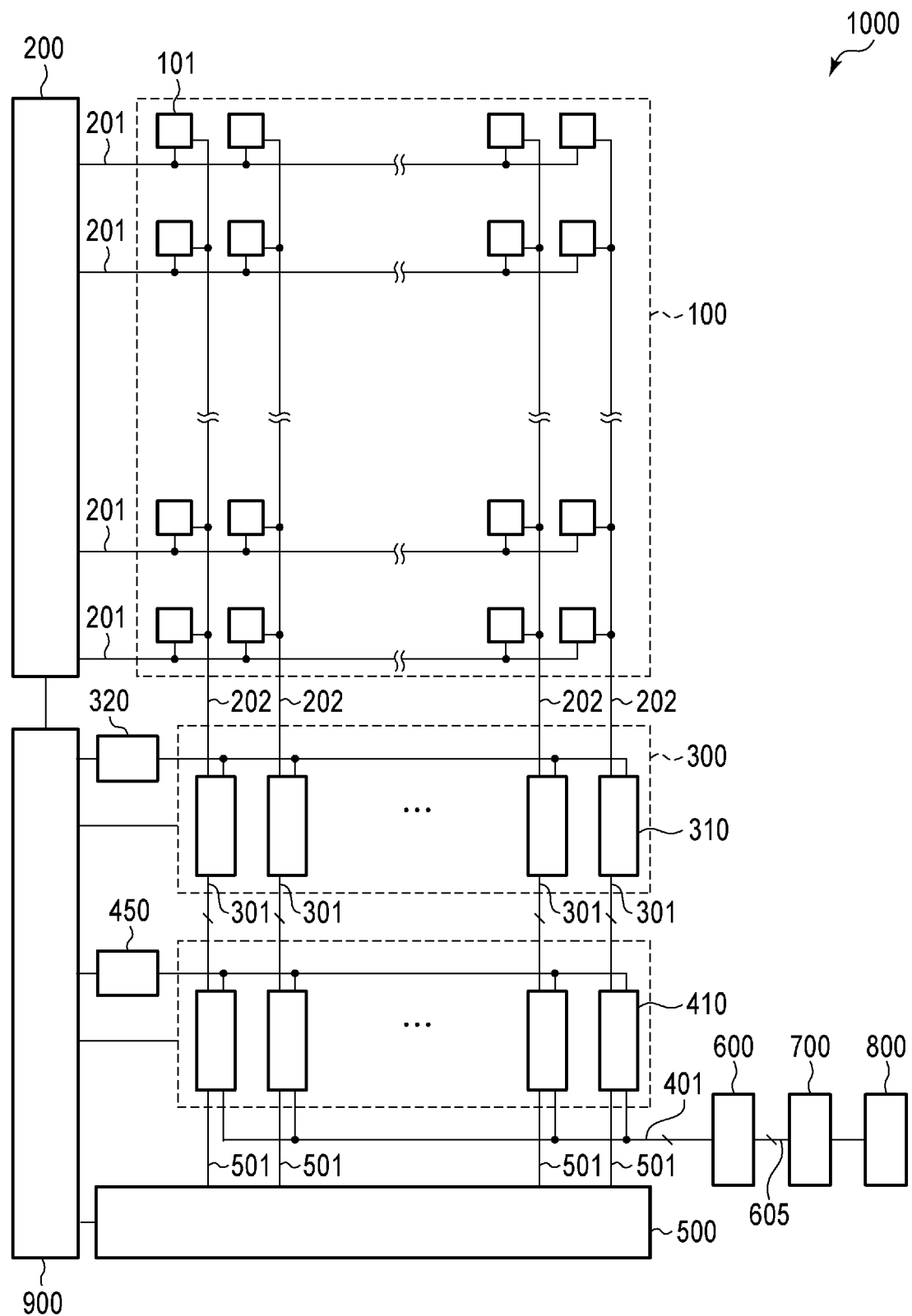
FIG. 25 is a block diagram illustrating a general configuration of an imaging device according to a fifth embodiment of the present invention.
Figure 26:
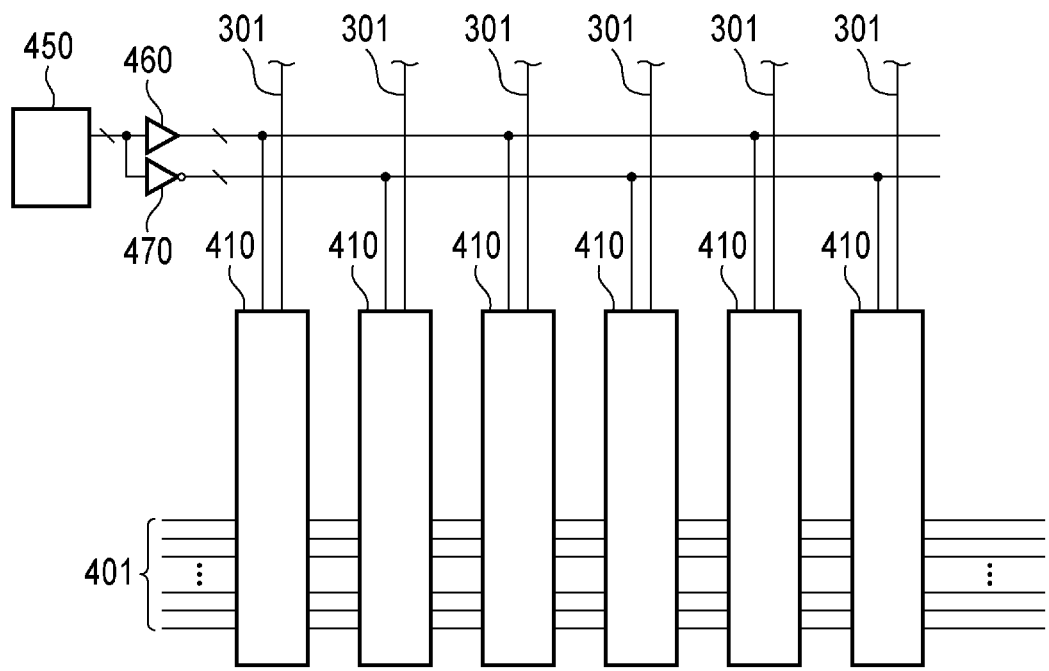
FIG. 26 is a schematic diagram illustrating a configuration example of a digital memory group in the imaging device according to the fifth embodiment of the present invention.
Figure 27:
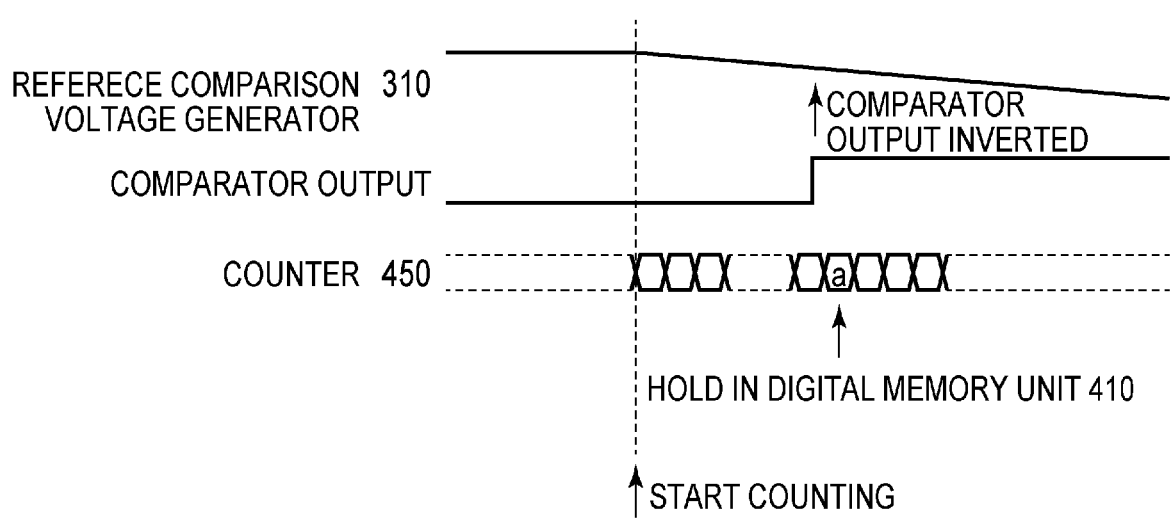
FIG. 27 is a diagram illustrating a drive method of the imaging device according to the fifth embodiment of the present invention.

An imaging device according to a fifth embodiment of the present invention will be described by using FIG. 25 to FIG. 27. The same component as that in the imaging device according to the first to fourth embodiments is labeled with the same reference, and the description thereof will be omitted or simplified. FIG. 25 is a block diagram illustrating a general configuration of the imaging device according to the present embodiment. FIG. 26 is a schematic diagram illustrating a configuration example of a digital memory group in the imaging device according to the present embodiment. FIG. 27 is a diagram illustrating a drive method of the imaging device according to the present embodiment.

In the present embodiment, an example in which an inversion process or a scrambling process of digital data is performed on the pre-stage on the digital memory cell 402 in the same manner as in the fourth embodiment will be described. In the present embodiment, an inversion process or a scrambling process of digital data is performed by using an A/D converter. Note that an A/D conversion scheme may be a pipeline type, a successive comparison type, an integration type, or the like, and an application in which an integration type A/D converter is used is illustrated in the present embodiment. However, the A/D conversion scheme applicable to the present invention is not particularly limited.

As illustrated in FIG. 25, the imaging device 1000 according to the present embodiment further includes a reference comparison voltage generator 320 and a counter 450 in addition to a configuration of the imaging device illustrated in FIG. 1. The reference comparison voltage generator 320 generates a reference comparison voltage whose signal level changes as time elapses, for example, a ramp voltage and supplies the voltage to the column signal processing unit 310 on each column. The column signal processing unit 310 on each column includes a comparator (not illustrated) that compares the level of an analog pixel signal with the level of the reference comparison voltage and outputs a signal in accordance with a result of the comparison to the digital memory unit 410 on the corresponding column. The counter 450 starts measuring time in synchronization with the start of a change of the level of the reference comparison voltage generated by the reference comparison voltage generator 320 and supplies a count value to the digital memory unit 410 on each column.

FIG. 26 is a diagram illustrating the connection relationship between the counter 450 and the digital memory units 410 on respective columns. As illustrated in FIG. 26, the N-bit count value output from the counter 450 is supplied to the digital memory units 410 on respective columns via the buffer 460 or the inverter 470. In FIG. 26, columns connected to the digital memory units 410 from the counter 450 via the buffer 460 and columns connected to the digital memory units 410 from the counter 450 via the inverter 470 are arranged alternately on a column basis. That is, a count value in which values of respective bits are inverted is supplied to the digital memory unit 410 on the adjacent column. The inverter 470 functions as a bit value inversion unit that inverts a value of each bit of data output from the counter 450.

Next, an A/D conversion operation in the imaging device according to the present embodiment will be described by using FIG. 27.

The reference comparison voltage generator 320 generates a ramped reference comparison voltage whose level changes as time elapses and supplies the generated reference comparison voltage to the column signal processing unit 310 on each column. FIG. 27 illustrates, as the reference comparison voltage, a reference comparison voltage whose voltage level decreases as time elapses.

The comparator of the column signal processing unit 310 compares the level of an analog pixel signal with the level of the reference comparison voltage. The comparator outputs a latch signal in accordance with a change of the relationship between the level of the analog pixel signal and the level of the reference comparison voltage. For example, FIG. 27 illustrates a case where the output signal of the comparator changes from a low level to a high level at a timing when the level of the analog pixel signal becomes higher than the level of the reference comparison voltage.

The counter 450 starts measuring (counting) time in synchronization with the start of a change of the level of the reference comparison voltage and supplies the measured count value to the digital memory unit 410 on each column.

The digital memory unit 410 that has received a latch signal from the comparator of the column signal processing unit 310 holds the count value, which has been received from the counter 450 at the timing when the latch signal has been received from the comparator, as an A/D conversion result in the digital memory cell 402.

That is, when the digital memory unit 410 to which a count value is supplied from the counter 450 via the buffer 460 receives a latch signal, a raw value of each bit of a count value-a is held in each bit of that digital memory unit 410 of interest. Further, when the digital memory unit 410 to which a count value is supplied from the counter 450 via the inverter 470 receives a latch signal, an inverted value of each bit of a count value-a is held in each bit of that digital memory unit 410 of interest.

As described above, in the imaging device according to the present embodiment, the digital memory units 410 connected to the counter 450 via the buffer 460 and the digital memory units 410 connected to the counter 450 via the inverter 470 are arranged alternately on a column basis. Thereby, a count value whose value of each bit is inverted can be supplied to the digital memory unit 410 on the adjacent column. That is, the form of transferring digital data in the imaging device according to the present embodiment is the same as that in the case of the fourth embodiment illustrated in FIG. 24.

As described above, according to the present embodiment, it is possible to reduce image quality deterioration due to a change in a consumption current involved by a horizontal transfer operation of a digital signal.

Note that, while the digital memory units 410 input with a count value via the buffer 460 and the digital memory units 410 input with a count value via the inverter 470 are arranged alternately on a column basis in the present embodiment, it is not necessarily required to be arranged alternately on a column basis. The connection between the counter 450 and the digital memory units 410 on respective columns can be appropriately selected in accordance with a form of an inversion process or a scrambling process applied to digital data.

Further, while the example in which the buffers 460 or the inverters 470 are arranged on signal lines of all the bits between the counter 450 and the digital memory units 410 has been illustrated in the present embodiment, the bit to which the buffer 460 or the inverter 470 is arranged or the number of such bits is not particularly limited.

Further, while the counter 450 is shared by A/D converters on respective columns in the present embodiment, each of the digital memory units 410 on respective columns may include a counter. In such a case, time may be measured on a column basis, and count results may be inverted, output, and transferred on every other column. Alternatively, A/D converters each using a counter for monotonic increase (up count) and A/D converters each using a counter for monotonic decrease (down count) may be arranged alternately on every other column. With such a configuration, values of respective bits of a count value can be inverted and output on every other column, and the same advantage as that of the present embodiment can be obtained.

Sixth Embodiment

Figure 28:
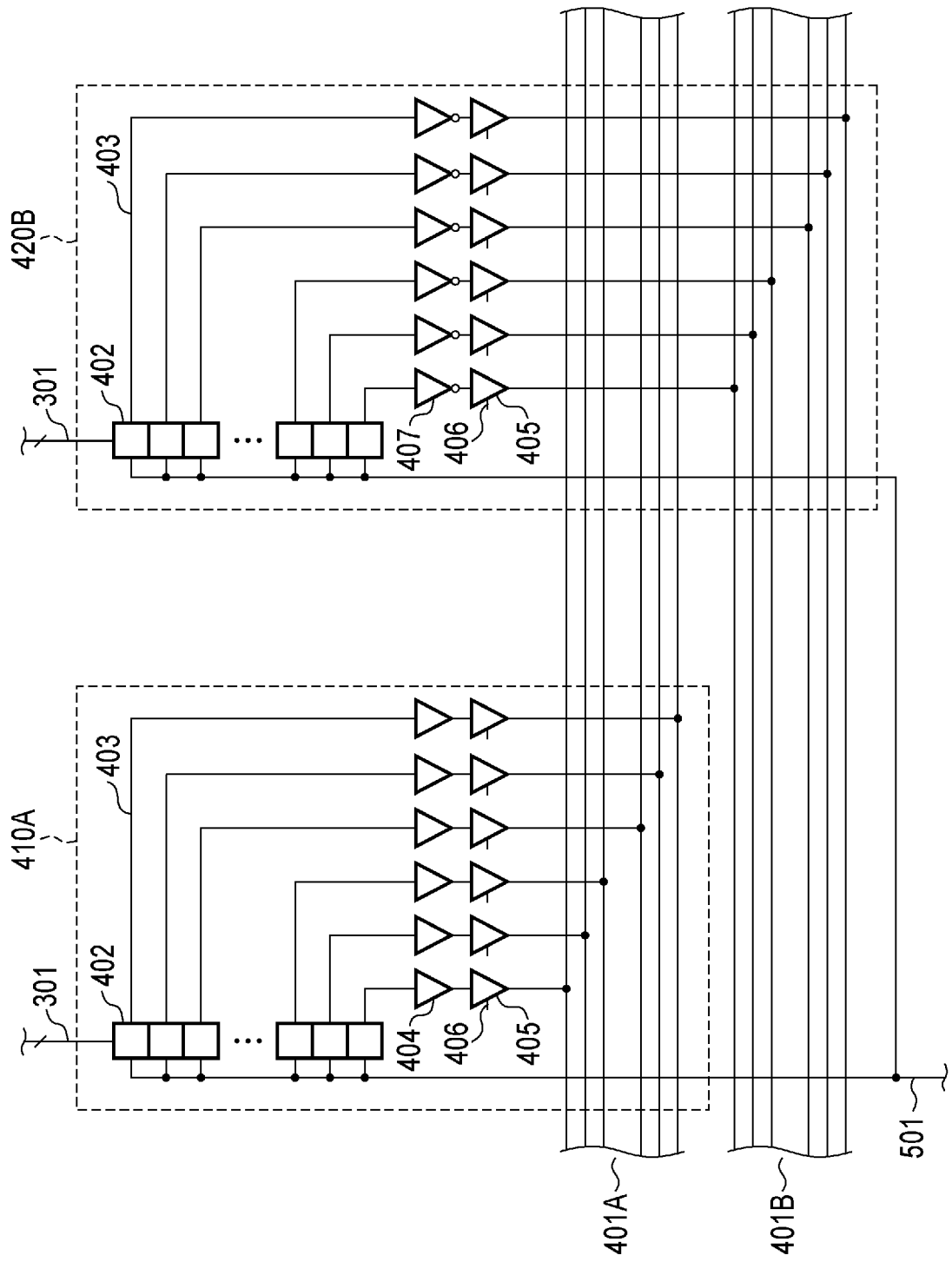
FIG. 28 is a schematic diagram illustrating a configuration example of a digital memory group in an imaging device according to a sixth embodiment of the present invention.
Figure 29:
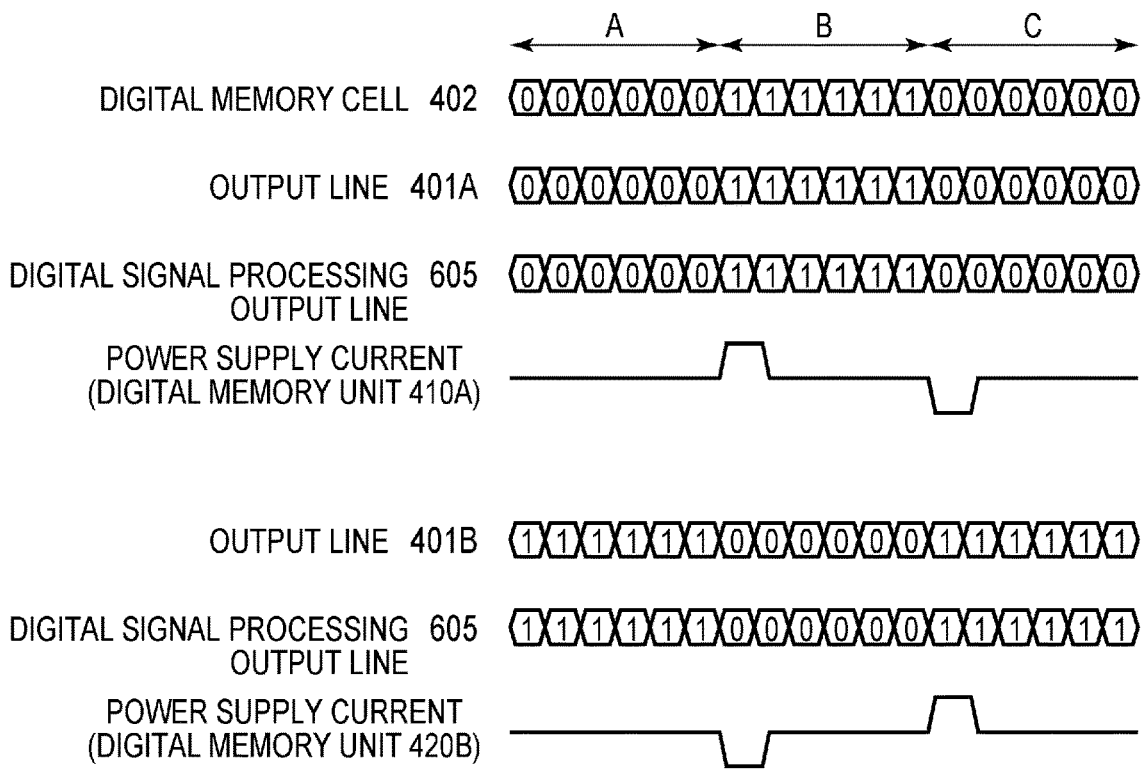
FIG. 29 is a diagram schematically illustrating data values on signal paths from the digital memory group to a digital signal processing output line when the object of FIG. 9 is captured by the imaging device according to the sixth embodiment of the present invention.

An imaging device according to a sixth embodiment of the present invention will be described with reference to FIG. 28 and FIG. 29. The same component as that in the imaging device according to the first to fifth embodiments is labeled with the same reference, and the description thereof will be omitted or simplified. FIG. 28 is a schematic diagram illustrating a configuration example of a digital memory group in the imaging device according to the present embodiment. FIG. 29 is a diagram schematically illustrating data values on signal paths from the digital memory group to a digital signal processing output line when the object of FIG. 9 is captured by the imaging device according to the present embodiment.

The basic configuration of the imaging device according to the present embodiment is the same as that of the imaging device according to the first embodiment except for the configuration of the digital memory group 400 and the common output line 401. That is, as illustrated in FIG. 28, the digital memory group 400 of the imaging device according to the present embodiment includes a plurality of digital memory units 410A and 420B provided in association with respective columns of the pixel array 100. Further, the imaging device according to the present embodiment includes two pairs of common output lines 401A and 401B in the same manner as the second and third embodiments.

The digital memory units 410A and 420B are arranged alternately on respective columns. For example, the digital memory units 410A are arranged on odd-numbered columns, and the digital memory units 420B are arranged on even-numbered columns. Alternatively, the digital memory units 420B are arranged on odd-numbered columns, and the digital memory units 410A are arranged on even-numbered columns. The digital memory units 410A and 420B are the same as the digital memory units 410A and 420B in the imaging device according to the second embodiment.

That is, the digital memory unit 410A includes the digital memory cells 402. Further, the digital memory unit 410A includes the buffers 404 and the tristate buffers 405 in association with respective bits of the digital memory cells 402, respectively. Each of the output terminals of the tristate buffers 405 of the digital memory unit 410A is connected to a signal line of the corresponding bit of N signal lines of the common output line 401A that outputs an N-bit signal.

Further, the digital memory unit 420B includes the digital memory cells 402. Further, the digital memory unit 420B includes the inverters 407 and the tristate buffers 405 in association with respective bits of the digital memory cells 402, respectively. Each of the output terminals of the tristate buffers 405 of the digital memory unit 420B is connected to a signal line of the corresponding bit of N signal lines of the common output line 401B that outputs an N-bit signal.

A plurality of columns of the pixel array 100 include pairs each formed of adjacent two columns. For example, the first column and the second column form one pair, and the third column and the fourth column form one pair. The common select signal line 501 that supplies the same control signal is connected to the digital memory units 410A and 420B belonging to each of the pairs.

With such a configuration, data held in the digital memory cells 402 of the digital memory unit 410A and data held in the digital memory cells 402 of the digital memory unit 420B can be read out in parallel to the common output lines 401A and 401B.

FIG. 29 is a diagram schematically illustrating data values on signal paths from the digital memory group 400 to the digital signal processing output line 605 when the object of FIG. 9 is captured by the imaging device according to the present embodiment and digital data on the n-th row is transferred. FIG. 29 illustrates data values held in a particular bit of the digital memory cells 402 of the digital memory units 410A and 420B on respective column and the data values of interest on the common output lines 401A and 401B and the digital signal processing output line 605 in the same manner as FIG. 11. Each data value held in the particular bit of interest of the digital memory cell 402 is "0" for a dark region and "1" for a bright region of FIG. 9.

In FIG. 29, the item "digital memory cell 402" indicates data values held in particular bit of the digital memory cells 402 on the consecutive 18 columns. It is here assumed that each of the ranges A, B, and C includes six columns. The item "common output line 401A" indicates data values on a signal line corresponding to the particular bit of interest of the common output line 401A. The item "common output line 401B" indicates data values on a signal line corresponding to the particular bit of interest of the common output line 401B. The item "digital signal processing output line 605" indicates data values on a signal line corresponding to the particular bit of interest of the digital signal processing output line 605. Further, FIG. 29 also illustrates the level of a power supply current of the tristate buffer 405 included in each of the digital memory units 410A and 420B. In FIG. 29, when the level of the power supply current changes, this indicates that the power supply current fluctuates.

In the object of FIG. 9, since the ranges A and C are dark and the range B is bright on the n-th row, "0" is held in the bit of interest of the digital memory cells 402 of the ranges A and C, "1" is held in the bit of interest of the digital memory cells 402 of the range B. Therefore, transition of data occurs at a timing of transition from a column of the range A to a column of the range B and a timing of transition from a column of range B to a column of the range C on the common output line 401A, the common output line 401B, and the digital signal processing output line 605. In this case, at these timings when transition of data occurs, fluctuation of the power supply current due to driving of the tristate buffers 405 occurs.

In the imaging device according to the present embodiment, however, values of the corresponding bit are inverted from each other and output to signal lines corresponding to the same bit of the common output line 401A and the common output line 401B. Thus, the polarity of fluctuation of the power supply current due to driving of the tristate buffer 405 in the digital memory unit 410A is opposite to the polarity of fluctuation of the power supply current due to driving of the tristate buffer 405 in the digital memory unit 420B. Therefore, the influence due to fluctuation of the power supply current in the digital memory unit 410A and the influence due to fluctuation of the power supply current in the digital memory unit 420B are cancelled each other, and the influence due to fluctuation of the power supply current can be suppressed as a whole. Further, the number of digital memory units that cause fluctuation of the power supply current of the same polarity can be reduced, and the absolute value of fluctuation of the power supply current of the same polarity can be reduced compared to the configuration of the digital memory group 400 of the imaging device according to the reference example illustrated in FIG. 7.

Further, in the imaging device according to the present embodiment, data held in the digital memory cells 402 of the digital memory units 410A and 420B can be read out in parallel to the common output lines 401A and 401B. Therefore, in the same manner as the second embodiment, it is possible to perform readout at a rate that is twice the rate in the imaging device of the first embodiment.

As described above, according to the present embodiment, it is possible to reduce image quality deterioration due to a change in a consumption current involved by a horizontal transfer operation of a digital signal.

Note that, while the digital memory units 410A and 420B are arranged alternately every one column in the present embodiment, the digital memory units 410A and 420B can be arranged alternately every two or more columns or on a particular number of columns basis. Further, transferred digital data may be decoded in the digital signal processing unit 600 or may be decoded outside the imaging device.

Seventh Embodiment

Figure 30:
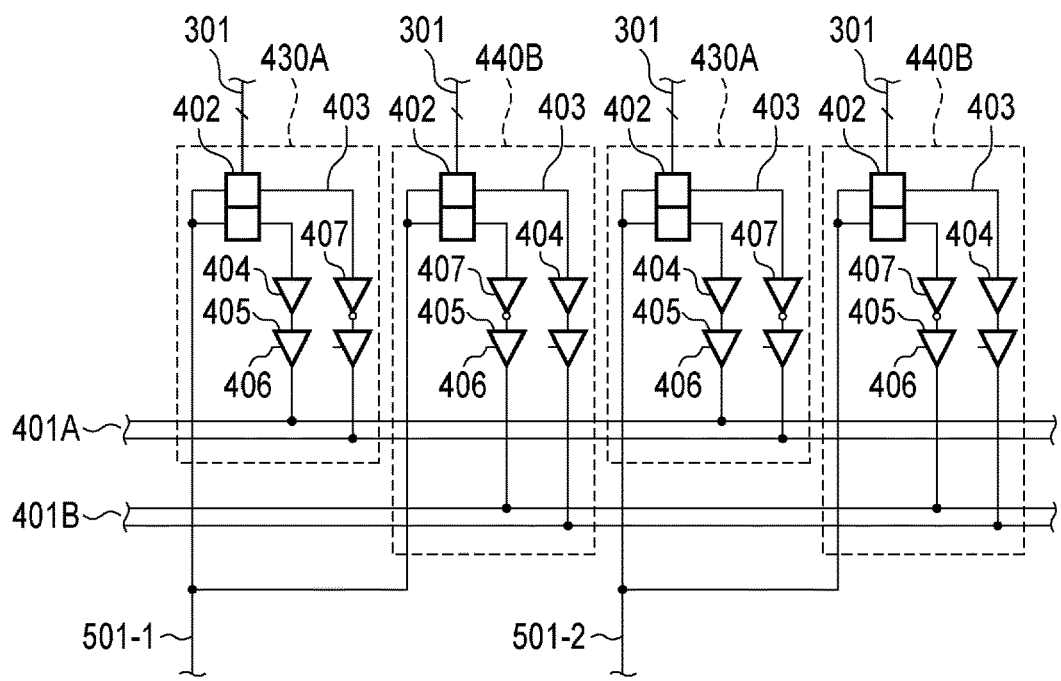
FIG. 30 is a schematic diagram illustrating a configuration example of a digital memory group in an imaging device according to a seventh embodiment of the present invention.

An imaging device according to a seventh embodiment of the present invention will be described with reference to FIG. 30. The same component as that in the imaging device according to the first to sixth embodiments is labeled with the same reference, and the description thereof will be omitted or simplified. FIG. 30 is a schematic diagram illustrating a configuration example of a digital memory group in the imaging device according to the present embodiment.

The basic configuration of the imaging device according to the present embodiment is the same as that of the imaging device according to the first embodiment except for the configuration of the digital memory group 400 and the common output line 401. That is, as illustrated in FIG. 30, the digital memory group 400 of the imaging device according to the present embodiment includes a plurality of digital memory units 430A and 440B provided in association with respective columns of the pixel array 100. Further, the imaging device according to the present embodiment includes two pairs of common output lines 401A and 401B in the same manner as the second, third, and sixth embodiments.

The digital memory units 430A and 440B are arranged alternately on respective columns. For example, the digital memory units 430A are arranged on odd-numbered columns, and the digital memory units 440B are arranged on even-numbered columns. Alternatively, the digital memory units 440B are arranged on odd-numbered columns, and the digital memory units 430A are arranged on even-numbered columns. The digital memory units 430A and 440B are the same as the digital memory units 430A and 440B in the imaging device according to the third embodiment. That is, each of the digital memory units 430A and 440B includes the digital memory cells 402, the buffers 404, the tristate buffers 405, and the inverters 407.

Each of the digital memory units 430A and 440B includes bits having the buffer 404 on the output path of digital data and bits having the inverters 407 on the output path of digital data. Further, the digital memory unit 430A and the digital memory unit 440B are configured such that bits having the buffer 404 and the bits having the inverter 407 are different from each other. For example, when the buffer 404 is arranged on the output path of the most significant bit of the digital memory unit 430A on the first column, the inverter 407 is arranged on the output path of the most significant bit of the digital memory unit 440B on the second column. The same applies to other bits.

Each of the output terminals of the tristate buffers 405 of the digital memory unit 430A is connected to a signal line of the corresponding bit of N signal lines of the common output line 401A that outputs an N-bit signal. Further, each of the output terminals of the tristate buffers 405 of the digital memory unit 440B is connected to a signal line of the corresponding bit of N signal lines of the common output line 401B that outputs an N-bit signal.

A plurality of columns of the pixel array 100 include pairs each formed of adjacent two columns. For example, the first column and the second column form one pair, and the third column and the fourth column form another pair. The common select signal line 501 that supplies the same control signal is connected to the digital memory units 430A and 440B belonging to each of the pairs. FIG. 30 illustrates a select signal line 501-1 connected to the digital memory unit 430A on the first column and the digital memory unit 440B on the second column and a select signal line 501-2 connected to the digital memory unit 430A on the third column and the digital memory unit 440B on the fourth column.

With such a configuration, in the same manner as in the sixth embodiment, values of the corresponding bits are inverted from each other and output to the signal lines corresponding to the same bit of the common output line 401A and the common output line 401B. Thus, the polarity of fluctuation of the power supply current due to driving of the tristate buffer 405 in the digital memory unit 430A is opposite to the polarity of fluctuation of the power supply current due to driving of the tristate buffer 405 in the digital memory unit 440B. Therefore, the influence due to fluctuation of the power supply current in the digital memory unit 430A and the influence due to fluctuation of the power supply current in the digital memory unit 440B are cancelled each other, and the influence due to fluctuation of the power supply current can be suppressed as a whole.

Further, in the imaging device according to the present embodiment, since data are inverted between adjacent bits, the polarity of current fluctuation or the occurrence timing of fluctuation of the tri state buffers 405 occurring in each of the digital memory units 430A and 440B are distributed, compared to the sixth embodiment. Therefore, sharp fluctuation of the power supply that may occur in accordance with the brightness or darkness of an object can be reduced.

As described above, according to the present embodiment, it is possible to reduce image quality deterioration due to a change in a consumption current involved by a horizontal transfer operation of a digital signal.

Eighth Embodiment

An imaging device according to an eighth embodiment of the present invention will be described with reference to FIG. 31 to FIG. 33. The same component as that in the imaging device according to the first to seventh embodiments is labeled with the same reference, and the description thereof will be omitted or simplified.

First, a general configuration of the imaging device according to the present embodiment will be described by using FIG. 31. FIG. 31 is a schematic diagram illustrating a configuration example of a digital memory group in the imaging device according to the present embodiment.

The basic configuration of the imaging device according to the present embodiment is the same as that of the imaging device according to the first embodiment except for the configuration between the signal processing unit 300 and the digital signal processing unit 600. That is, as illustrated in FIG. 31, the digital memory group 400 of the imaging device according to the present embodiment includes a plurality of digital memory blocks 1400 and is connected to the digital signal processing unit 600 via a common output line 1420, a buffer unit 1411, and a common output line 1421.

The digital memory group 400 includes the plurality of digital memory blocks 1400. Each of the digital memory blocks 1400 is provided in association with each of the plurality columns in the pixel array 100. For simplified illustration, FIG. 31 illustrates a case as an example where the pixel array 100 is formed of 12 columns and each of the four digital memory blocks 1400-1, 1400-2, 1400-3, and 1400-4 is associated with three columns of the 12 columns. The digital memory blocks 1400-1, 1400-2, 1400-3, and 1400-4 has the same configuration. To simplify the diagram here, detailed illustration of the digital memory blocks 1400-2, 1400-3, and 1400-4 other than the digital memory block 1400-1 is omitted. Note that the number of digital memory blocks 1400 included in the digital memory group 400 and the number of columns associated with each of the digital memory blocks 1400 are not particularly limited.

Each of the digital memory blocks 1400 includes a plurality of digital memory units 1401 and a buffer unit 1404. The plurality of digital memory units 1401 of each of the digital memory blocks 1400 are provided on respective columns associated with the digital memory block 1400 of interest, respectively. For simplified illustration, FIG. 31 illustrates a case as an example where each of the digital memory blocks 1400 includes three digital memory units 1401-1, 1401-2, and 1401-3 corresponding to three columns. The digital memory units 1401-1, 1401-2, and 1401-3 have the same configuration. To simplify the diagram here, detailed illustration of the digital memory units 1401-2 and 1401-3 other than the digital memory unit 1401-1 is omitted.

Each of the digital memory units 1401 includes an N-bit digital memory cells 402. Further, each of the digital memory unit 1401 includes the buffer 404, the inverter 407, the tristate buffer 405, switches 1402 and 1403 in association with each bit of the digital memory cell 402. Note that, to simplify the drawing and illustration here, only one set of the buffer 404, the inverter 407, the tristate buffer 405, and the switches 1402 and 1403 connected to a particular bit of the digital memory cell 402 is illustrated.

The digital memory cell 402 is connected to the signal processing output line 301 on the corresponding column. N signal lines of the signal processing output line 301 to which N-bit digital pixel signal is output are connected to respective bits of the digital memory cells 402 for N bits. Each bit of the digital memory cell 402 is connected to the input terminal of the buffer 404 and the input terminal of the inverter 407 via the digital memory cell output line 403. Further, the select signal line 501 is connected to each bit of the digital memory cell 402. The output terminal of the buffer 404 is connected to the input terminal of the tristate buffer 405 via the switch 1402. The output terminal of the inverter 407 is connected to the input terminal of the tristate buffer 405 via the switch 1403. The output terminal of the tristate buffer 405 is connected to a signal line of a corresponding bit of the N signal lines forming the common output line 401. Note that, in the present embodiment, the common output lines 401 are provided independently for each digital memory block 1400.

Each buffer unit 1404 includes a buffer 1405, an inverter 1406, switches 1407 and 1408, and a tristate buffer 1409 in association with each of the N signal lines forming the common output line 401. Note that, to simplify the drawing and illustration here, only one set of the buffer 1405, the inverter 1406, the switches 1407 and 1408, and the tristate buffer 1409 connected to a signal line of a particular bit of the N signal lines of the common output line 401 is illustrated.

The input terminal of the buffer 1405 and the input terminal of the inverter 1406 are connected to a signal line of a corresponding bit of N signal lines forming the common output line 401. The output terminal of the buffer 1405 is connected to the input terminal of the tristate buffer 1409 via the switch 1407. The output terminal of the inverter 1406 is connected to the input terminal of the tristate buffer 1409 via the switch 1408. The tristate buffer 1409 is connected to a buffer control line 1410, and the tristate buffer 1409 is able to be controlled by a buffer control signal supplied from the control unit 900. The output terminal of the tristate buffer 1409 is connected to a signal line of a corresponding bit of N signal lines forming the common output line 1420.

The common output line 1420 is connected to the buffer unit 1411. Each buffer unit 1411 includes a buffer 1412, an inverter 1413, switches 1414 and 1415 in association with each of the N signal lines forming the common output line 1420. Note that, to simplify the drawing and illustration here, only one set of the buffer 1412, the inverter 1413, and the switches 1414 and 1415 connected to a signal line of a particular bit of N signal lines of the common output line 1420 is illustrated.

The input terminal of the buffer 1412 and the input terminal of the inverter 1413 are connected to a signal line of a corresponding bit of N signal lines forming the common output line 1420. The output terminal of the buffer 1412 is connected to a signal line of a corresponding bit of N signal lines forming the common output line 1421 via the switch 1414. The output terminal of the inverter 1413 is connected to a signal line of a corresponding bit of N signal lines forming the common output line 1421 via the switch 1415. The common output line 1421 is connected to the digital signal processing unit 600.

The digital memory unit 1401 on each column holds, in the digital memory cell 402, a digital pixel signal output from the column signal processing unit 310 on a corresponding column via the signal processing output line 301. In response to receiving a control signal from the horizontal scanning unit 500 via the select signal line 501, the digital memory cell 402 of the digital memory unit 1401 outputs data of each bit to the digital memory cell output line 403. In response to any one of the switches 1402 and 1403 being turned on, the data output to the digital memory cell output line 403 is not inverted or inverted, input to the tristate buffer 405, and output to a signal line of a corresponding bit of the common output line 401. That is, when the switch 1402 is turned on, data output to the digital memory cell output line 403 is output to the common output line 401 via the buffer 404, the switch 1402, and the tristate buffer 405. Further, when the switch 1403 is turned on, data output to the digital memory cell output line 403 is output to the common output line 401 via the inverter 407, the switch 1403, and the tristate buffer 405. The tristate buffer 405 is configured to be able to control the output to a high impedance state by a control signal supplied via the buffer control line 406, and the output is controlled to a high impedance state when other columns are selected.

Data output to the common output line 401 is input to the buffer unit 1404. In response to any one of the switches 1407 and 1408 of the buffer unit 1404 being turned on, the data input to the buffer unit 1404 is not inverted or is inverted, input to the tristate buffer 1409, and output to a signal line of a corresponding bit of the common output line 1420. That is, when the switch 1407 is turned on, data output to the buffer unit 1404 via the common output line 401 is output to the common output line 1420 via the buffer 1405, the switch 1407, and the tristate buffer 1409. Further, when the switch 1408 is turned on, data output to the buffer unit 1404 via the common output line 401 is output to the common output line 1420 via the inverter 1406, the switch 1408, and the tristate buffer 1409. The tristate buffer 1409 is configured to be able to control the output to a high impedance state by a control signal supplied via the buffer control line 1410, and the output is controlled to a high impedance state when other digital memory units 1401 are selected.

Data output to the common output line 1420 is input to the buffer unit 1411, and in response to any one of the switches 1414 and 1415 of the buffer unit 1411 being turned on, not inverted or inverted and output to a signal line of a corresponding bit of the common output line 1421. That is, when the switch 1414 is turned on, data input to the buffer unit 1411 via the common output line 1420 is output to the common output line 1421 via the buffer 1412 and the switch 1414. Further, when the switch 1415 is turned on, data input to the buffer unit 1411 via the common output line 1420 is output to the common output line 1421 via the inverter 1413 and the switch 1415. The data output to the common output line 1421 is input to the digital signal processing unit 600.

In the present embodiment, the common output line 401 is arranged for each digital memory block 1400. Thus, when the total number of columns of the digital memory units 1401 is the same as that in the case of the first embodiment, the number of connected tristate buffers 405 of the digital memory unit 1401 can be reduced compared to the first embodiment. Further, a shorter physical length of the extending common output line 401 can reduce a parasitic load. Thereby, a drive load on the common output line 401 can be reduced, and transfer of digital data can be faster.

Figure 31:
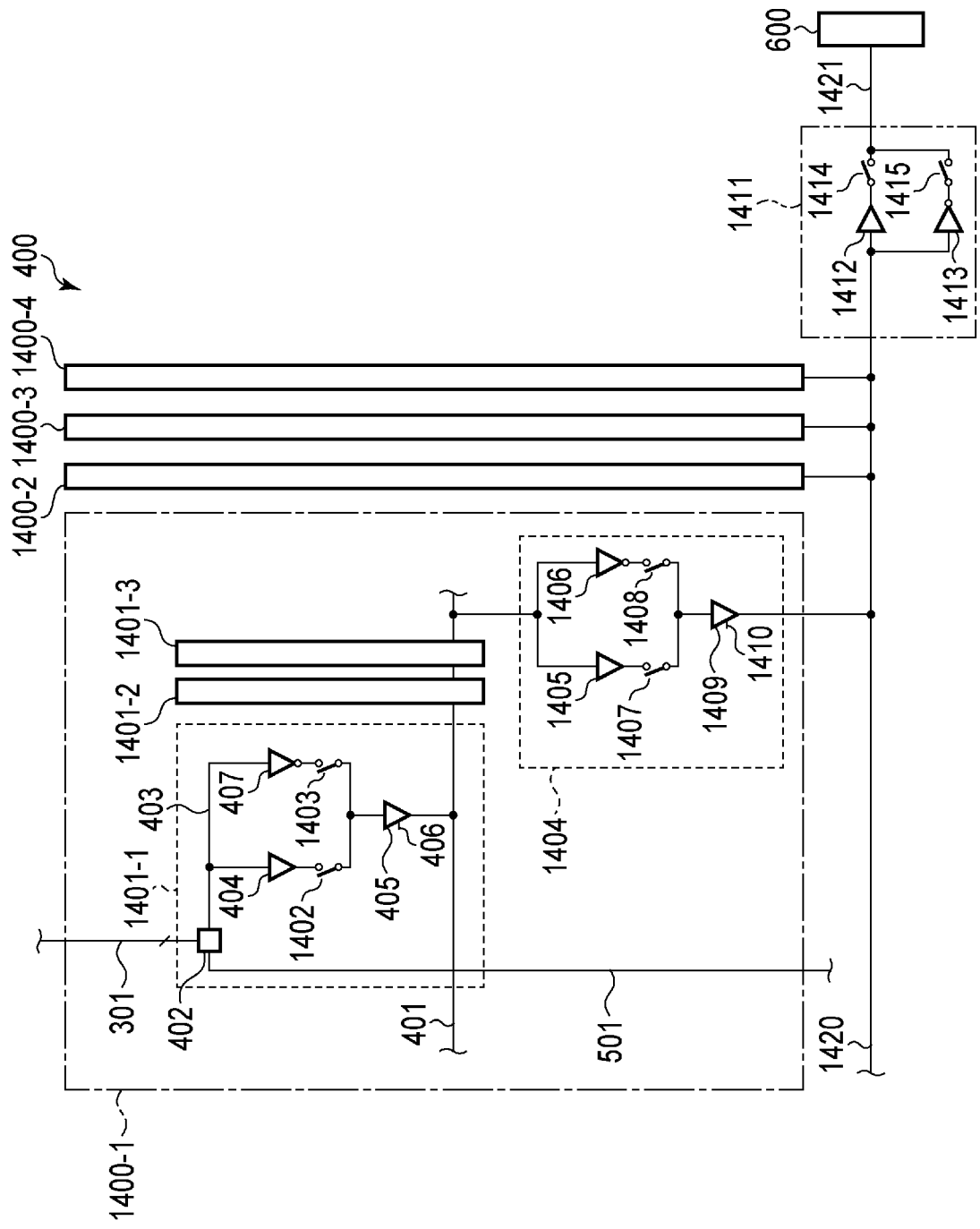
FIG. 31 is a schematic diagram illustrating a configuration example of a digital memory group in an imaging device according to an eighth embodiment of the present invention.

Further, while one buffer unit 1411 is provided to all the digital memory blocks 1400-1, 1400-2, 1400-3, and 1400-4 in the configuration example of FIG. 31, two or more buffer units 1411 may be provided. For example, four buffer units 1411 each corresponding to the digital memory blocks 1400-1, 1400-2, 1400-3, and 1400-4 may be provided. With such a configuration, in the same manner as the common output line 401, a drive load on the common output line 1420 can be reduced, and transfer of digital data can be faster.

Next, the operation of the imaging device according to the present embodiment will be described by using FIG. 32 and FIG. 33. FIG. 32 and FIG. 33 are diagrams schematically illustrating data values on signal paths from the digital memory group 400 to a digital signal processing output line 605 when the object of FIG. 9 is captured by the imaging device according to the present embodiment and digital data on the n-th row is transferred. The operation of switches is different between FIG. 32 and FIG. 33.

Figure 32:
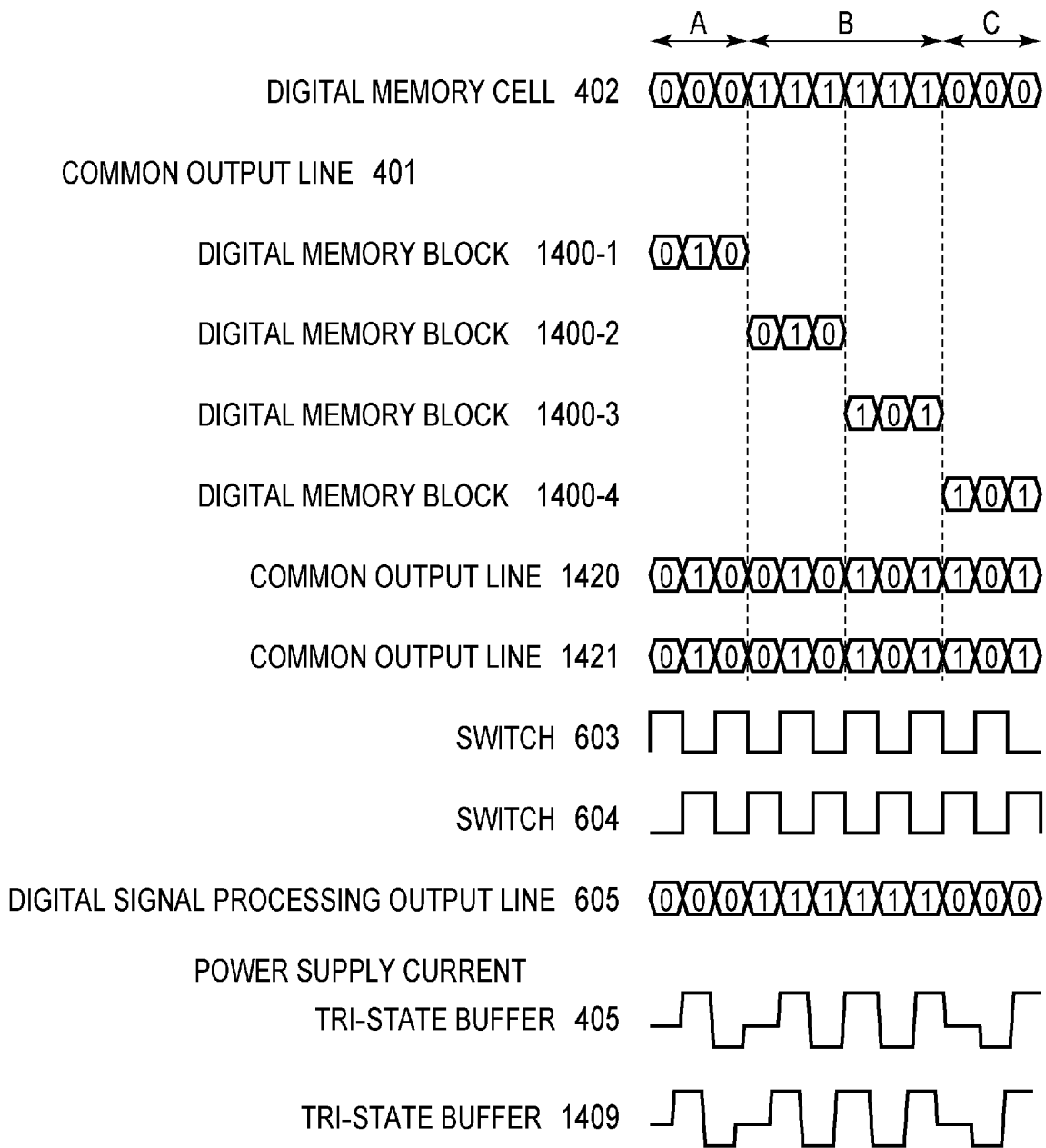
FIG. 32 and FIG. 33 are diagrams schematically illustrating data values on signal paths from the digital memory group to a digital signal processing output line when the object of FIG. 9 is captured by the imaging device according to the eighth embodiment of the present invention.
Figure 33:
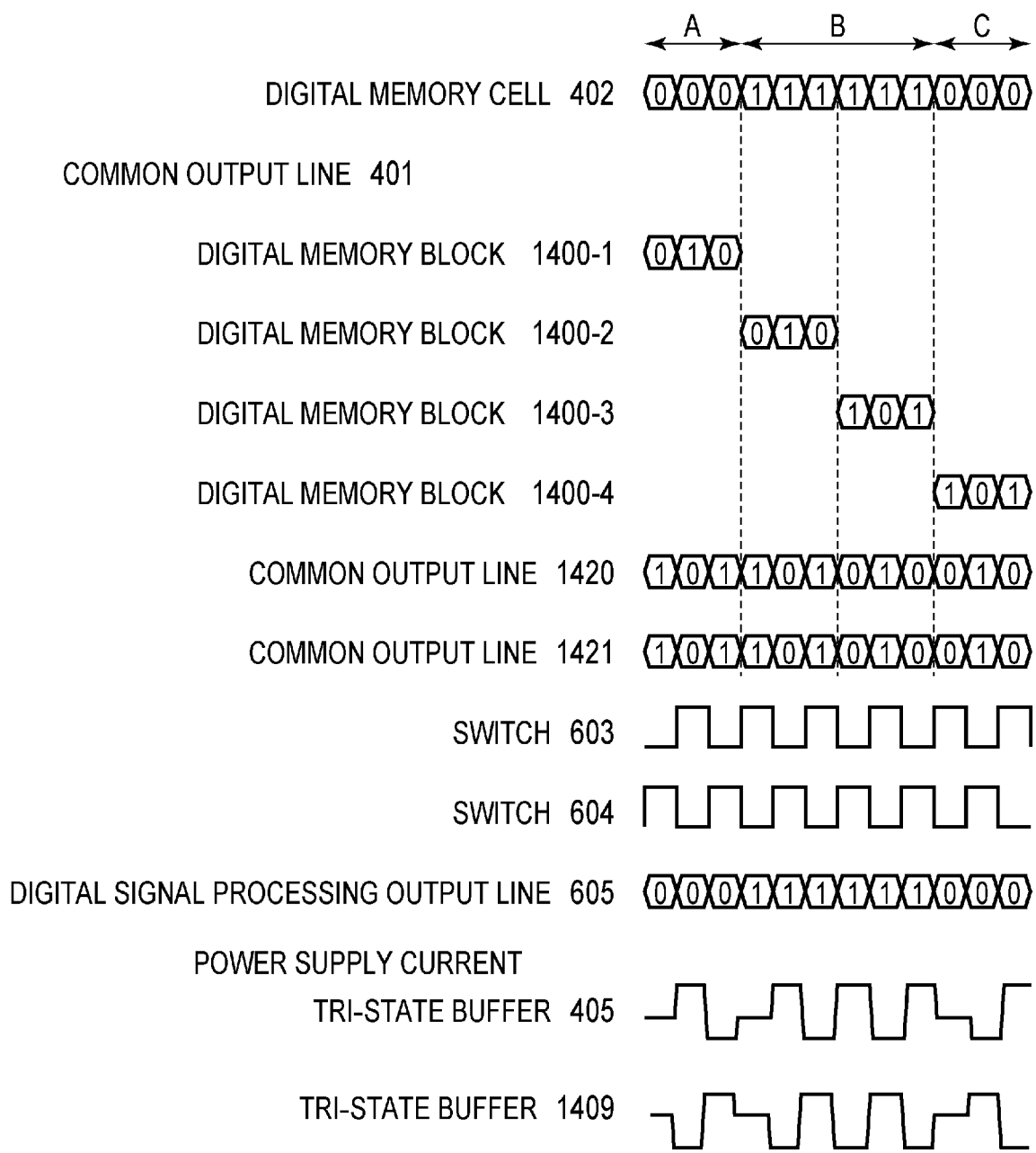

FIG. 32 and FIG. 33 illustrate data values held in a particular bit of the digital memory cells 402 of the digital memory units 1401 on respective columns and the data values of interest on the common output lines 401, 1420, and 1421 and the digital signal processing output line 605. Each data value held in the particular bit of interest of the digital memory cell 402 is "0" for a dark region and "1" for a bright region of FIG. 9.

In FIG. 32 and FIG. 33, the item "digital memory cell 402" indicates data values held in particular bit of the digital memory cells 402 on the consecutive 12 columns. It is here assumed that the ranges A includes three columns, the ranges B includes six columns, and the ranges C includes three columns. The range A corresponds to the digital memory block 1400-1, the range B corresponds to the digital memory blocks 1400-2 and 1400-3, and the range C corresponds to the digital memory block 1400-4. The item "common output line 401" indicates data values on a signal line corresponding to the particular bit of interest of the common output line 401 of each of the digital memory blocks 1400-1, 1400-2, 1400-3, and 1400-4. The item "common output line 1420" indicates data values on a signal line corresponding to the particular bit of interest of the common output line 1420. The item "common output line 1421" indicates data values on a signal line corresponding to the particular bit of interest of the common output line 1421. The items "switch 603" and "switch 604" indicate signal levels of control signals of the switches 603 and 604. The item "digital signal processing output line 605" indicates data values on a signal line corresponding to the particular bit of interest of the digital signal processing output line 605. Further, FIG. 32 and FIG. 33 also illustrate the levels of power supply currents of the tristate buffers 405 and 1409. In FIG. 32 and FIG. 33, when the level of the power supply current changes, this indicates that the power supply current fluctuates.

Here, the tristate buffer 405 causes fluctuation of the power supply current of each digital memory block 1400. Further, the tristate buffer 1409 causes fluctuation of the power supply current of the digital memory group 400. In the description here, the power supplies of the tristate buffers 405 and 1409 are the same, and the sum thereof is the power supply current of the digital memory group 400. The tristate buffer 405 is arranged in each of the plurality of digital memory units 1401, and the tristate buffer 1409 is arranged in each of the plurality of digital memory blocks 1400, and fluctuation of the power supply current occurs in a period in which data is being transferred. FIG. 32 illustrates continuous power supply fluctuation as fluctuation of the common power supply.

First, a first drive example of the imaging device according to the present embodiment will be described by using FIG. 32. Note that driving of switches described in the present embodiment is an example and does not limit a drive method of the switches.

In the first drive example, the switches 1402 of the digital memory units 1401-1 and 1401-3 of the digital memory blocks 1400-1 and 1400-3 are set to an on-state, and the switches 1403 of the same are set to an off-state. Further, the switches 1402 of the digital memory units 1401-2 of the digital memory blocks 1400-1 and 1400-3 are set to an off-state, and the switches 1403 of the same are set to an on-state. On the other hand, the switches 1402 of the digital memory units 1401-1 and 1401-3 of the digital memory blocks 1400-2 and 1400-4 are set to an off-state, and the switches 1403 of the same are set to an on-state. Further, the switches 1402 of the digital memory units 1401-2 of the digital memory blocks 1400-2 and 1400-4 are set to an on-state, and the switches 1403 of the same are set to an off-state. That is, data input to the tristate buffers 405 of the digital memory units 1401 on respective columns have a relationship of non-inversion, inversion, non-inversion, inversion, . . . in the order of column number with respect to data held in the digital memory cells 402.

The switches 1407 of the buffer units 1404 included in the digital memory blocks 1400-1, 1400-2, 1400-3, and 1400-4 are set to an on-state, and the switches 1408 of the same are set to an off-state. That is, data output from the digital memory blocks 1400-1 to 1400-4 to the common output line 1420 have a relationship of non-inversion with respect to data output from the tristate buffer 405 of each of the digital memory units 1401-1 to 1401-3.

The switch 1414 of the buffer unit 1411 is set to an on-state, and the switch 1415 of the same is set to an off-state. That is, data output from the buffer unit 1411 to the common output line 1421 has a relationship of non-inversion with respect to data input from the common output line 1420 to the buffer unit 1411 and is input to the digital signal processing unit 600.

The switches 603 and 604 of the digital signal processing unit 600 are driven so that the on-state and the off-state are switched every time data on each column is transferred, as described by using FIG. 16 in the first embodiment.

In the object of FIG. 9, since the ranges A and C are dark and the range B is bright on the n-th row, "0" is held in a particular bit of the corresponding digital memory cell 402 on the columns of the ranges A and C, and "1" is held in the particular bit of interest of the corresponding digital memory cell 402 on the column of the range B.

Data in accordance with the state of the switches 1402 and 1403 described above are transferred from the digital memory cells 402 to the common output line 401 of each digital memory block 1400.

For example, digital data 0, 0, 0 are held in this order in the digital memory cells 402 on corresponding three columns of the digital memory block 1400-1. These digital data are digital data having a relationship of non-inversion, inversion, non-inversion, respectively, and input to the tristate buffers 405. Therefore, data 0, 1, 0 are sequentially transferred to the common output line 401 of the digital memory block 1400-1.

Further, digital data 1, 1, 1 are held in this order in the digital memory cells 402 on corresponding three columns of the digital memory block 1400-2. These digital data are digital data having a relationship of inversion, non-inversion, inversion, respectively, and input to the tristate buffers 405. Therefore, data 0, 1, 0 are sequentially transferred to the common output line 401 of the digital memory block 1400-2.

On the common output lines 1420 and 1421, both input signals are transferred as data having a relationship of non-inversion and input to the digital signal processing unit 600. In the digital signal processing unit 600, the switches 603 and 604 are controlled to be alternately turned on as described by using FIG. 16 in the first embodiment. Therefore, data are transferred to the digital signal processing output line 605 in the same order as the order of data held in the digital memory cells 402 on respective columns.

In the object of FIG. 9, transition of data occurs at a timing of transition from a column of the range A to a column of the range B and a timing of transition from a column of the range B to a column of the range C. In such a case, fluctuation of the power supply current due to driving of the tristate buffers 405 and 1409 occurs at these timing when transition of data occurs.

Also in the first drive example of the present embodiment, however, in the same manner as in the first embodiment, fluctuation of the power supply current occurs regardless of brightness or darkness of an object when the state of each switch is appropriately set. Therefore, fluctuation of the power supply current depending on the position of a bright part or a dark part of an object can be reduced. That is, by appropriately driving each switch, it is possible to reduce fluctuation of the power supply current more effectively.

Next, a second drive example of the imaging device according to the present embodiment will be described by using FIG. 33. The second drive example is different from the first drive example in the state of switches.

In the second drive example, the setting of the switches 1402 and 1403 of the digital memory units 1401-1 to 1401-3 of the digital memory blocks 1400-1 to 1400-4 is the same as that of the first drive example.

The switches 1407 of the buffer units 1404 included in the digital memory blocks 1400-1 to 1400-4 are set to an off-state, and the switches 1408 of the same are set to an on-state. That is, data output from the digital memory blocks 1400-1 to 1400-4 to the common output line 1420 have a relationship of inversion with respect to data output from the tristate buffer 405 of each of the digital memory units 1401-1 to 1401-3.

The switch 1414 of the buffer unit 1411 is set to an on-state, and the switch 1415 of the same is set to an off-state. That is, data output from the buffer unit 1411 to the common output line 1421 has a relationship of non-inversion with respect to data input from the common output line 1420 to the buffer unit 1411 and is input to the digital signal processing unit 600.

While the switches 603 and 604 of the digital signal processing unit 600 are driven so that the on-state and the off-state are switched every time data on each column is transferred, the on-period and the off-period of the switches 603 and 604 are opposite to the first drive example.

In the object of FIG. 9, since the ranges A and C are dark and the range B is bright on the n-th row, "0" is held in a particular bit of the corresponding digital memory cell 402 on the columns of the ranges A and C, and "1" is held in the particular bit of interest of the corresponding digital memory cell 402 on the column of the range B.

Data in accordance with the state of the switches 1402 and 1403 described above are transferred from the digital memory cells 402 to the common output line 401 of each digital memory block 1400. Since the setting of the switches 1402 and 1403 in the second drive example is the same as the first drive example, data output to the common output line 401 is the same as that in the case of the first drive example.

On the common output lines 1420 and 1421, both input signals are transferred as data having a relationship of inversion and input to the digital signal processing unit 600. That is, in data on the common output line 1420 and the common output line 1421 in the second drive example, each corresponding data is inverted with respect to the first drive example.

The switches 603 and 604 are alternately turned on in the digital signal processing unit 600, and the on-period and off-period are opposite to those in the first drive example. Thereby, data are transferred to the digital signal processing output line 605 in the same order as the order of data held in the digital memory cells 402 on respective columns in the same manner as the first drive example.

Also in the second drive example of the present embodiment, fluctuation of the power supply current of the tristate buffers 405 and 1409 due to transition of data occurs. However, fluctuation of the power supply current occurs regardless of brightness or darkness of an object when the state of each switch is appropriately set. Therefore, fluctuation of the power supply current depending on the position of a bright part or a dark part of an object can be reduced. That is, by appropriately driving each switch, it is possible to reduce fluctuation of the power supply current more effectively.

In particular, in the second drive example, the polarity of fluctuation of the drive current in the tristate buffer 405 is opposite to the polarity of fluctuation of the drive current in the tristate buffer 1409. Therefore, the fluctuation of the power supply current is cancelled, and the amount of fluctuation can be reduced.

As described above, in the imaging device according to the present embodiment, digital data held in the digital memory group 400 can be controlled to be not inverted or be inverted on a column basis or a bit basis. Further, non-inversion or inversion of data can be controlled on a data transfer path. Thereby, specific fluctuation of a power supply current that may occur due to a horizontal transfer operation of digital data can be suppressed or reduced, and deterioration of image quality depending on the position of a bright part or a dark part of an object can be reduced.

Note that, in the present embodiment, the switches 1402 and 1403 that select one of the buffer 404 and the inverter 407 are provided in the digital memory unit 1401, and non-inversion or inversion of data input to the tristate buffer 405 is controlled. However, the digital memory unit 1401 may fix non-inversion and inversion of data input to the tristate buffer 405 in a similar manner to the digital memory unit 1401 of the first or second embodiment. In such a case, non-inversion or inversion of data to be transferred is not necessarily required to be performed in the digital memory unit 1401 and may be controlled in the buffer units 1404 and 1411 or the digital signal processing unit 600.

Further, while the state of the switches 1402, 1403, 1407, 1408, 1414, and 1415 are maintained at image capturing in the present embodiment, the on-state and the off-state may be switched every time data is transferred in a similar manner to the switches 603 and 604. A unit in which each switch is controlled is not particularly limited, may be performed per the digital memory block 1400, or may be performed per the digital memory unit 1401, for example.

Further, while the common output line 401 is divided for each digital memory block 1400 to achieve faster processing in the present embodiment, the common output line 1420 may also be divided to achieve much faster processing. Further, the connection relationship between each digital memory unit 1401 and the common output lines 401, 1420, and 1421 or the number of signal lines arranged in parallel is not limited to the configuration described in the present embodiment.

Ninth Embodiment

An imaging system according to a ninth embodiment of the present invention will be described with reference to FIG. 34. FIG. 34 is a block diagram illustrating a general configuration of the imaging system according to the present embodiment.

The imaging device 1000 described in the above first to eighth embodiments is applicable to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 34 illustrates a block diagram of a digital still camera as an example out of these examples.

The imaging system 1200 illustrated as an example in FIG. 34 includes an imaging device 1201, a lens 1202 that captures an optical image of an object onto the imaging device 1201, an aperture 1204 for changing a light amount passing through the lens 1202, and a barrier 1206 for protecting the lens 1202. The lens 1202 and the aperture 1204 form an optical system that converges a light onto the imaging device 1201. The imaging device 1201 is the imaging device 1000 described in any of the first to eighth embodiments and converts an optical image captured by the lens 1202 into image data.

The imaging system 1200 further includes a signal processing unit 1208 that processes an output signal output from the imaging device 1201. The signal processing unit 1208 preforms AD conversion that converts an analog signal output by the imaging device 1201 into a digital signal. In addition, the signal processing unit 1208 performs various correction and compression other than above, if necessary, and outputting image data. An AD conversion unit, which is a part of the signal processing unit 1208, may be formed on a semiconductor substrate on which the imaging device 1201 is provided or a semiconductor substrate on which the imaging device 1201 is not provided. Further, the imaging device 1201 and the signal processing unit 1208 may be formed on the same semiconductor substrate.

The imaging system 1200 further includes a memory unit 1210 for temporarily storing image data therein and an external interface unit (external I/F unit) 1212 for communicating with an external computer or the like. The imaging system 1200 further includes a storage medium 1214 such as a semiconductor memory for performing storage or readout of imaging data and a storage medium control interface unit (storage medium control I/F unit) 1216 for performing storage or readout on the storage medium 1214. Note that the storage medium 1214 may be embedded in the imaging system 1200 or may be removable.

The imaging system 1200 further includes a general control/operation unit 1218 that controls various operations and the entire digital still camera and a timing generation unit 1220 that outputs various timing signals to the imaging device 1201 and the signal processing unit 1208. Here, the timing signal or the like may be input from the outside, and the imaging system 1200 may include at least the imaging device 1201 and the signal processing unit 1208 that processes an output signal output from the imaging device 1201.

The imaging device 1201 outputs an imaging signal to the signal processing unit 1208. The signal processing unit 1208 performs predetermined signal processing on an imaging signal output from the imaging device 1201 and outputs image data. The signal processing unit 1208 generates an image by using the imaging signal.

As discussed above, according to the present embodiment, the imaging system to which the imaging device 1000 according to the first to eighth embodiments is applied can be realized.

Tenth Embodiment

Figure 35A:
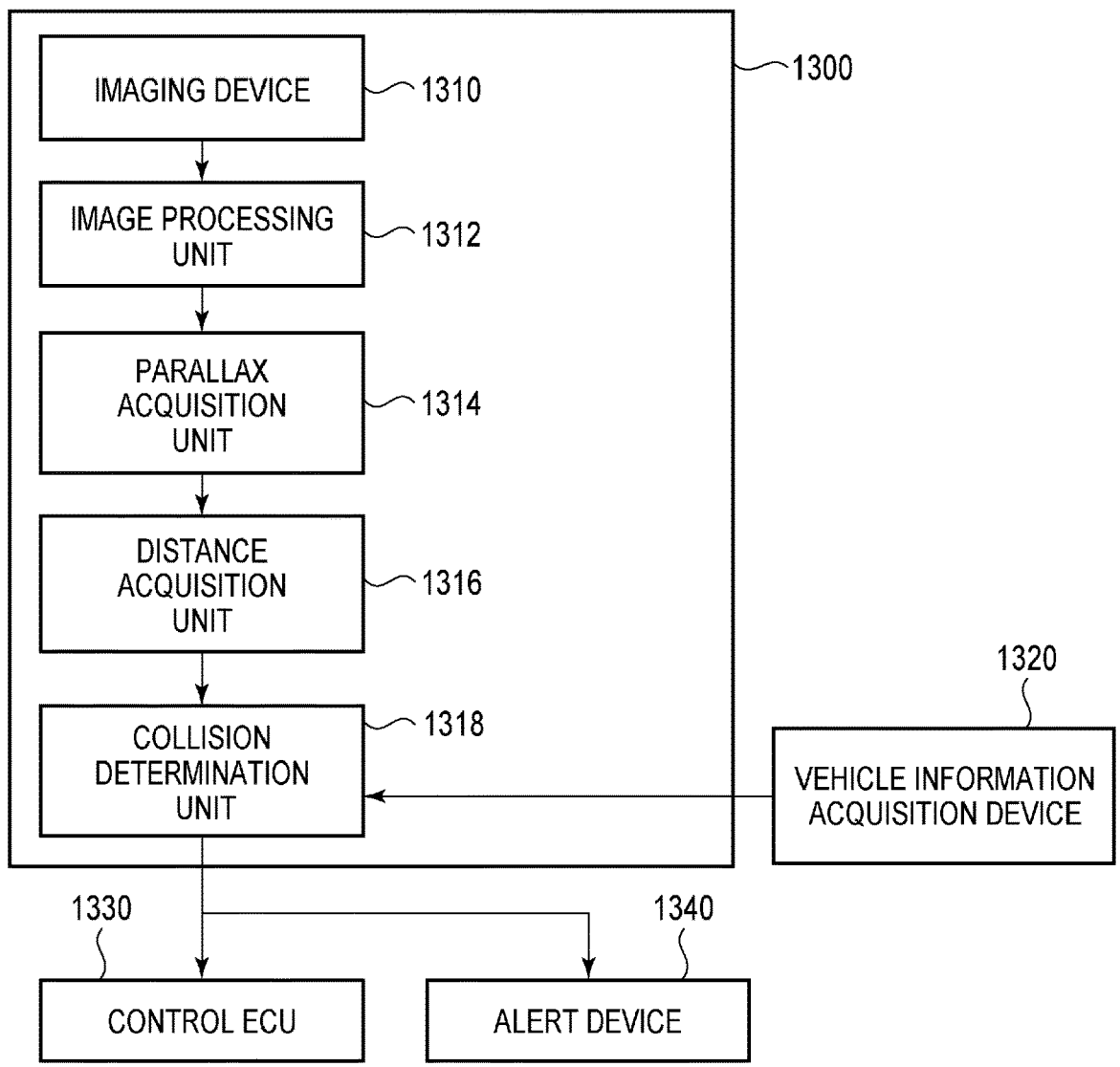
FIG. 35A is a diagram illustrating a configuration example of an imaging system according to a tenth embodiment of the present invention.
Figure 35B:
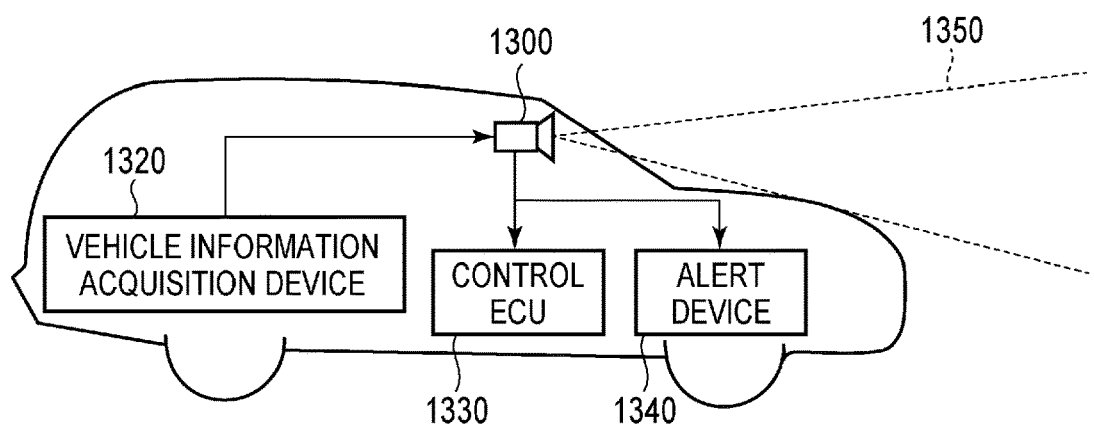
FIG. 35B is a diagram illustrating a configuration example of a movable object according to the tenth embodiment of the present invention.

An imaging system and a movable object according to a tenth embodiment of the present invention will be described with reference to FIG. 35A and FIG. 35B. FIG. 35A is a diagram illustrating a configuration of an imaging system according to the present embodiment. FIG. 35B is a diagram illustrating a configuration of a movable object according to the present embodiment.

FIG. 35A illustrates an example of an imaging system related to an on-vehicle camera. The imaging system 1300 includes an imaging device 1310. The imaging device 1310 is the imaging device 1000 described in any of the above first to eighth embodiments. The imaging system 1300 includes an image processing unit 1312 that performs image processing on a plurality of image data acquired by the imaging device 1310 and a parallax acquisition unit 1314 that calculates a parallax (a phase difference of parallax images) from the plurality of image data acquired by the imaging system 1300. Further, the imaging system 1300 includes a distance acquisition unit 1316 that calculates a distance to the object based on the calculated parallax and a collision determination unit 1318 that determines whether or not there is a collision possibility based on the calculated distance. Here, the parallax acquisition unit 1314 and the distance acquisition unit 1316 are an example of a distance information acquisition unit that acquires distance information on the distance to the object. That is, the distance information is information on a parallax, a defocus amount, a distance to an object, or the like. The collision determination unit 1318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 1300 is connected to the vehicle information acquisition device 1320 and can acquire vehicle information such as a vehicle speed, a yaw rate, a steering angle, or the like. Further, the imaging system 1300 is connected to a control ECU 1330, which is a control device that outputs a control signal for causing a vehicle to generate braking force based on a determination result by the collision determination unit 1318. Further, the imaging system 1300 is also connected to an alert device 1340 that issues an alert to the driver based on a determination result by the collision determination unit 1318. For example, when the collision probability is high as the determination result of the collision determination unit 1318, the control ECU 1330 performs vehicle control to avoid a collision or reduce damage by applying a brake, pushing back an accelerator, suppressing engine power, or the like. The alert device 1340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 1300. FIG. 35B illustrates the imaging system when a front area of a vehicle (a capturing area 1350) is captured. The vehicle information acquisition device 1320 transmits an instruction to the imaging system 1300 or the imaging device 1310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

For example, while an inversion process or a scrambling process of digital data is performed on the post-stage of the digital memory cell 402 in the first to third embodiments described above and performed on the pre-stage of the digital memory cell 402 in the fourth and fifth embodiments, such a process may be performed on both stages. In such a case, data processing on each stage may be appropriately combined so that data on the common output line 401 transitions in the form described in the above embodiments.

Further, while devices intended to capture an image, that is, imaging devices have been described as examples in the above first to eighth embodiments, application of the present invention is not necessarily limited to an imaging device. For example, in a case of the application to a device intended for ranging as described in the above tenth embodiment, it is not necessarily required to output an image. In such a case, said device can be referred to as a photoelectric conversion device that converts light information into a predetermined electrical signal. An imaging device is one of the photoelectric conversion devices.

Further, although the imaging device to which the present invention is applied has been described in the above first to eighth embodiments, a feature of having a plurality of pixels that output signals in accordance with a light amount of an incident light is not an essential requirement of the present invention. According to one aspect of the present invention, it is possible to configure a signal processing device that performs predetermined signal processing described in the above first to eighth embodiments on a signal based on an incident light, for example.

Further, the imaging systems illustrated in the above ninth and tenth embodiments are examples of an imaging system to which the photoelectric conversion device of the present invention may be applied, and an imaging system to which the photoelectric conversion device of the present invention can be applied is not limited to the configuration illustrated in FIG. 34 and FIG. 35A.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-119645, filed Jun. 25, 2018 and Japanese Patent Application No. 2019-018616, filed Feb. 5, 2019, which are hereby incorporated by reference herein in their entirety.

What is claimed is:

1. An imaging device comprising:
a plurality of pixels arranged to form a plurality of rows and a plurality of columns and each configured to output a signal in accordance with an incident light;
a plurality of column signal processing units provided in association with the plurality of columns and each having an A/D conversion unit that performs A/D conversion on a signal output from the pixels arranged on a corresponding column;
a plurality of memory units provided in association with the plurality of columns and each having a memory that holds digital data output from the column signal processing unit of a corresponding column;
a transfer unit that sequentially outputs the digital data held in each of the plurality of memory units to a common output line; and
a bit value inversion unit that inverts a value of a bit of one of first digital data and second digital data that are sequentially output to the common output line.

2. The imaging device according to claim 1, wherein the bit value inversion unit is provided in each of the memory units and inverts a value of a bit of the digital data held in the memory to output the inverted value to the common output line.

3. The imaging device according to claim 1, wherein the bit value inversion unit is provided in each of the column signal processing units and inverts a value of a bit of the digital data to output the inverted value to each of the memory units.

4. The imaging device according to claim 3 further comprising a counter common to the A/D conversion units on the plurality of columns,
wherein the bit value inversion unit inverts a value of a bit of a count value output from the counter to each of the memory units.

5. The imaging device according to claim 3, wherein each of the column signal processing unit includes the A/D conversion unit having a counter that performs up-count and the A/D conversion unit having a counter that performs down-count.

6. The imaging device according to claim 1, wherein the bit value inversion unit inverts values of a plurality of bits forming the digital data, respectively.

7. The imaging device according to claim 1, wherein the bit value inversion unit inverts one or more values of some of a plurality of bits forming the digital data.

8. The imaging device according to claim 1, wherein the bit value inversion unit is provided on every other column.

9. The imaging device according to claim 1 further comprising a plurality of common output lines that output the digital data in parallel,
wherein the bit value inversion unit is provided on every other column for a column corresponding to each of the plurality of common output lines.

10. The imaging device according to claim 1,
wherein the bit value inversion unit includes a first bit value inversion unit and a second bit value inversion unit provided alternately on a column basis,
wherein the first bit value inversion unit inverts one or more values of some of a plurality of bits forming the digital data corresponding to the first digital data, and
wherein the second bit value inversion unit inverts one or more values of the other of a plurality of bits forming the digital data corresponding to the second digital data.

11. The imaging device according to claim 1 further comprising a decode processing unit provided on a post-stage of the common output line and configured to perform a decode process to restore a value of a bit inverted by the bit value inversion unit.

12. An imaging system comprising:
the imaging device according to claim 1; and
a signal processing unit that processes signals output from the pixels of the imaging device.

13. A movable object comprising:
the imaging device according to claim 1;
a distance information acquisition unit that acquires distance information on a distance to an object, from a parallax image based on signals output from the imaging device; and
a control unit that controls the movable object based on the distance information.

14. An imaging device comprising:
a plurality of pixels arranged to form a plurality of rows and a plurality of columns and each configured to output a signal in accordance with an incident light;
a plurality of column signal processing units provided in association with the plurality of columns and each having an A/D conversion unit that performs A/D conversion on a signal output from the pixels arranged on a corresponding column;
a plurality of memory units provided in association with the plurality of columns and each having a memory that holds digital data output from the column signal processing unit of a corresponding column;
a transfer unit that sequentially outputs the digital data held in each of the plurality of memory units to a common output line; and
a scrambling unit that performs a scrambling process on at least one of first digital data and second digital data that are sequentially output to the common output line.

15. The imaging device according to claim 14, wherein the scrambling unit is provided in each of the memory units and performs the scrambling process on the digital data held in the memory to output the scrambled digital data to the common output line.

16. The imaging device according to claim 14, wherein the scrambling unit is provided in each of the column signal processing units and performs the scrambling process on the digital data output from the A/D conversion unit to output the scrambled digital data to each of the memory units.

17. The imaging device according to claim 14, wherein the scrambling unit is provided on every other column.

18. The imaging device according to claim 14 further comprising a plurality of common output lines that output the digital data in parallel,
wherein the scrambling unit is provided on every other column for a column corresponding to each of the plurality of common output lines.

19. The imaging device according to claim 14 further comprising a decode processing unit provided on a post-stage of the common output line and configured to perform a decode process to restore the scrambling process performed on the digital data by the scrambling unit.

20. The imaging device according to claim 14, wherein an operation to output signals of the pixels belonging to one row to the column signal processing units and an operation to output, to the common output line, the digital data based on signals output from the pixels belonging to another row are performed in parallel.

21. The imaging device according to claim 14, wherein an operation to perform A/D conversion on signals output from the pixels belonging to one row and an operation to output, to the common output line, the digital data based on signals output by the pixels belonging to another row are performed in parallel.

22. An imaging device comprising:
a plurality of pixels arranged to form a plurality of rows and a plurality of columns and each configured to output a signal in accordance with an incident light;
a plurality of column signal processing units provided in association with the plurality of columns and each having an A/D conversion unit that performs A/D conversion on a signal output from the pixels arranged on a corresponding column;
a plurality of memory units provided in association with the plurality of columns and each having a memory that holds digital data output from the column signal processing unit of a corresponding column;
a plurality of output lines;
a transfer unit that outputs the digital data held by the plurality of memory units to the plurality of output lines; and
a bit value inversion unit including a unit that inverts a value of a bit of at least one of first digital data output from a first memory unit of the plurality of memory units and second digital data output from a second memory unit of the plurality of memory units.

23. The imaging device according to claim 22, wherein the transfer unit sequentially outputs the first digital data and the second digital data to a common output line of the plurality of output lines.

24. The imaging device according to claim 22,
wherein the plurality of output lines include a first output line and a second output line, and
wherein the transfer unit outputs the first digital data to the first output line and outputs the second digital data to the second output line.

25. The imaging device according to claim 24, wherein the transfer unit simultaneously outputs the first digital data and the second digital data.

26. The imaging device according to claim 22, wherein the bit value inversion unit is provided in each of the memory units and inverts a value of a bit of the digital data held in the memory to output the inverted value to the output lines.

27. The imaging device according to claim 22, wherein the bit value inversion unit inverts values of a plurality of bits forming the digital data, respectively.

28. The imaging device according to claim 22, wherein the bit value inversion unit inverts one or more values of some of a plurality of bits forming the digital data.

29. The imaging device according to claim 22, wherein the bit value inversion unit is provided on every other column.

30. The imaging device according to claim 22,
wherein the bit value inversion unit includes a first bit value inversion unit and a second bit value inversion unit provided alternately on a column basis,
wherein the first bit value inversion unit inverts one or more values of some of a plurality of bits forming the digital data corresponding to the first digital data, and
wherein the second bit value inversion unit inverts one or more values of the other of a plurality of bits forming the digital data corresponding to the second digital data.

31. The imaging device according to claim 22, wherein the first memory unit and the second memory unit are arranged on adjacent columns.

32. The imaging device according to claim 22 further comprising a decode processing unit provided on a post-stage of the output lines and configured to perform a decode process to restore a value of a bit inverted by the bit value inversion unit.

33. An imaging system comprising:
the imaging device according to claim 22; and
a signal processing unit that processes signals output from the pixels of the imaging device.

34. A movable object comprising:
the imaging device according to claim 22;
a distance information acquisition unit that acquires distance information on a distance to an object, from a parallax image based on signals output from the imaging device; and
a control unit that controls the movable object based on the distance information.

35. A signal processing device comprising:
a plurality of signal processing units each having an A/D conversion unit that performs A/D conversion on a signal based on an incident light;
a plurality of memory units provided in association with the plurality of signal processing units and each having a memory that holds digital data output from corresponding one of the signal processing units;
a transfer unit that sequentially outputs the digital data held in each of the plurality of memory units to a common output line; and
a processing unit that inverts a value of a bit of at least one of first digital data and second digital data that are sequentially output to the common output line and/or performs a scrambling process on at least one of the first digital data and the second digital data.

36. A signal processing device comprising:
a plurality of signal processing units each having an A/D conversion unit that performs A/D conversion on a signal based on an incident light;
a plurality of memory units provided in association with the plurality of signal processing units and each having a memory that holds digital data output from corresponding one of the signal processing units;
a plurality of output lines;
a transfer unit that outputs the digital data held in the plurality of memory units to the plurality of output lines; and
a bit value inversion unit including a unit that inverts a value of a bit of at least one of first digital data output from a first memory unit of the plurality of memory units and second digital data output from a second memory unit of the plurality of memory units.

* * * * *